(12) United States Patent
Judd et al.

(10) Patent No.: US 11,935,558 B2
(45) Date of Patent: *Mar. 19, 2024

(54) TAPE ACCLIMATION ACCELERATION FOR ENVIRONMENTAL CALIBRATION

(71) Applicant: International Business Machines Corporation, Armonk, NY (US)

(72) Inventors: Kevin Bruce Judd, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,623

(22) Filed: Dec. 22, 2022

(65) Prior Publication Data

US 2023/0129334 A1    Apr. 27, 2023

Related U.S. Application Data

(63) Continuation of application No. 17/443,098, filed on Jul. 20, 2021, now Pat. No. 11,605,400.

(51) Int. Cl.
*G11B 15/60* (2006.01)
*G11B 5/78* (2006.01)
(Continued)

(52) U.S. Cl.
CPC .............. *G11B 15/60* (2013.01); *G11B 5/78* (2013.01); *G11B 15/20* (2013.01); *G11B 27/36* (2013.01); *G11B 5/00813* (2013.01)

(58) Field of Classification Search
None
See application file for complete search history.

(56) References Cited

U.S. PATENT DOCUMENTS 5,946,156 A    8/1999   Schwarz et al.
6,992,857 B2   1/2006   Knowles et al.
(Continued)

FOREIGN PATENT DOCUMENTS

CN    1124399 A    6/1996
EP    616319 A2    9/1994
(Continued)

OTHER PUBLICATIONS

Notice of Allowance from U.S. Appl. No. 17/443,098, dated Nov. 17, 2022.
(Continued)

*Primary Examiner* — William J Klimowicz
(74) *Attorney, Agent, or Firm* — Zilka-Kotab, P.C.

(57) ABSTRACT

A method, according to one embodiment, includes cycling a shorter length of a tape, that is less than an entire length of the tape, a plurality of times to acclimate the shorter length of the tape. An acclimation change amount of the shorter length of the tape is determined. The acclimation change amount is based on a baseline servo band difference (SBD) measured before the cycling and a post cycling SBD measured after the cycling. The method further includes adjusting SBD values from a beginning of the tape (BOT) to an end of the tape (EOT) based on the determined acclimation change amount. A system according to another embodiment includes a processor, and logic integrated with the processor, executable by the processor, or integrated with and executable by the processor. The logic is configured to cause the processor to perform operations of the foregoing method.

25 Claims, 14 Drawing Sheets

(51) Int. Cl.
*G11B 15/20* (2006.01)
*G11B 27/36* (2006.01)
*G11B 5/008* (2006.01)

(56) References Cited

U.S. PATENT DOCUMENTS

| | | | |
|---|---|---|---|
| 7,158,339 B2 | 1/2007 | Kuse et al. | |
| 7,307,809 B2 | 12/2007 | Neumann | |
| 7,391,587 B2 | 6/2008 | Dugas et al. | |
| 7,411,759 B2 | 8/2008 | Trabert et al. | |
| 7,649,707 B2 | 1/2010 | Saliba | |
| 7,660,069 B2 | 2/2010 | Trabert et al. | |
| 7,929,243 B2 | 4/2011 | Bui et al. | |
| 8,139,312 B2 | 3/2012 | Bui et al. | |
| 8,154,811 B2 | 4/2012 | Barsotti et al. | |
| 8,264,789 B2 | 9/2012 | Kawakami et al. | |
| 8,526,135 B2 | 9/2013 | Ohtsu et al. | |
| 8,711,501 B2 | 4/2014 | Childers et al. | |
| 8,937,786 B1 * | 1/2015 | Herget | G11B 5/4893 360/77.12 |
| 9,153,279 B1 | 10/2015 | Hikita | |
| 9,251,826 B1 | 2/2016 | Bayang et al. | |
| 9,361,921 B2 | 6/2016 | Herget | |
| 9,640,208 B2 | 5/2017 | Poorman et al. | |
| 10,438,619 B1 * | 10/2019 | Kilbey | G11B 5/584 |
| 10,460,757 B1 | 10/2019 | Judd et al. | |
| 10,475,477 B1 * | 11/2019 | Biskeborn | G11B 5/00813 |
| 10,566,022 B1 | 2/2020 | Judd et al. | |
| 10,832,722 B2 | 11/2020 | Judd et al. | |
| 11,605,400 B2 | 3/2023 | Judd et al. | |
| 2004/0174132 A1 | 9/2004 | Johnson et al. | |
| 2005/0248869 A1 | 11/2005 | Bartlett | |
| 2005/0254161 A1 | 11/2005 | Nakao | |
| 2006/0285240 A1 | 12/2006 | Jurneke | |
| 2007/0041121 A1 | 2/2007 | Neumann | |
| 2008/0198503 A1 | 8/2008 | Saliba | |
| 2008/0305366 A1 | 12/2008 | Hsieh et al. | |
| 2009/0268339 A1 | 10/2009 | Trabert et al. | |
| 2010/0246043 A1 | 9/2010 | Barsotti et al. | |
| 2011/0122522 A1 | 5/2011 | Itagaki et al. | |
| 2012/0050910 A1 | 3/2012 | Ohtsu et al. | |
| 2012/0087031 A1 | 4/2012 | Goker et al. | |
| 2014/0240866 A1 | 8/2014 | Hancock et al. | |
| 2016/0179417 A1 | 6/2016 | Fasen et al. | |
| 2016/0189737 A1 | 6/2016 | Poorman et al. | |
| 2018/0240485 A1 * | 8/2018 | Bui | G11B 5/584 |
| 2020/0035264 A1 * | 1/2020 | Judd | G11B 5/56 |
| 2020/0035266 A1 * | 1/2020 | Judd | G11B 5/00817 |
| 2020/0143830 A1 | 5/2020 | Judd et al. | |
| 2020/0143831 A1 | 5/2020 | Judd et al. | |
| 2020/0166322 A1 | 5/2020 | Judd et al. | |
| 2020/0168245 A1 | 5/2020 | Biskeborn | |
| 2020/0302964 A1 | 9/2020 | Murata et al. | |
| 2021/0398554 A1 | 12/2021 | Musha et al. | |
| 2022/0197515 A1 | 6/2022 | Peng et al. | |
| 2022/0277770 A1 | 9/2022 | Kamimura et al. | |
| 2022/0308758 A1 * | 9/2022 | Itagaki | G06F 3/0604 |
| 2023/0033482 A1 | 2/2023 | Judd et al. | |

FOREIGN PATENT DOCUMENTS

| | | | | |
|---|---|---|---|---|
| GB | 2499899 A | * | 9/2013 | ......... G11B 5/00813 |
| JP | 2005235273 A | | 9/2005 | |
| WO | 2015016922 A1 | | 2/2015 | |

OTHER PUBLICATIONS

IBM, List of IBM Patents Or Patent Applications Treated As Related, dated Jan. 31, 2023, 2 pages.
Judd et al., U.S. Appl. No. 16/181,210, filed Nov. 5, 2018.
Notice of Allowance from U.S. Appl. No. 16/181,210, dated Jun. 10, 2019.
Judd et al., U.S. Appl. No. 16/528,458, filed Jul. 31, 2019.
Non-Final Office Action from U.S. Appl. No. 16/528,458, dated Feb. 3, 2020.
Non-Final Office Action from U.S. Appl. No. 16/528,458, dated Jul. 14, 2020.
Final Office Action from U.S. Appl. No. 16/528,458, dated Oct. 22, 2020.
Examiner's Answer to Appeal Brief from U.S. Appl. No. 16/528,458, dated Jul. 6, 2021.
Judd et al., U.S. Appl. No. 16/528,475, filed Jul. 31, 2019.
Non-Final Office Action from U.S. Appl. No. 16/528,475, dated Sep. 11, 2019.
Notice of Allowance from U.S. Appl. No. 16/528,475, dated Sep. 27, 2019.
Judd et al., U.S. Appl. No. 16/661,929, filed Oct. 23, 2019.
Non-Final Office Action from U.S. Appl. No. 16/661,929, dated Apr. 8, 2020.
Notice of Allowance from U.S. Appl. No. 16/661,929, dated Aug. 5, 2020.
Judd et al., U.S. Appl. No. 16/201,739, filed Nov. 27, 2018.
Judd et al., U.S. Appl. No. 17/443,098, filed Jul. 20, 2021.
International Search Report and Written Opinion from PCT Application No. PCT/IB2022/056134, dated Oct. 9, 2022.
Ex Parte Quayle from U.S. Appl. No. 17/443,098, dated Aug. 1, 2022.

* cited by examiner

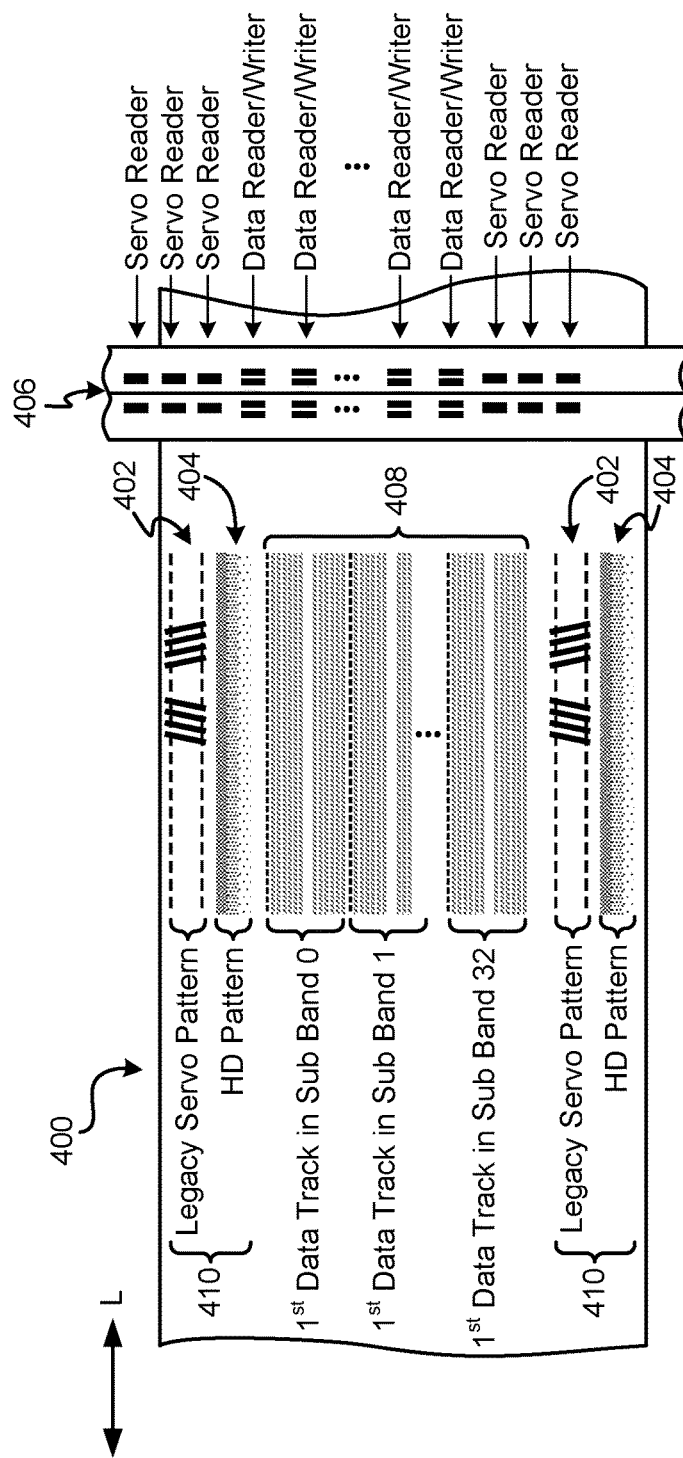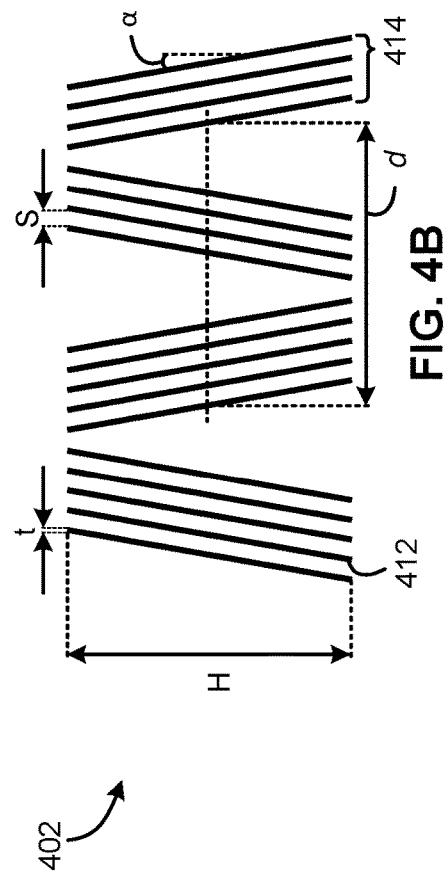
FIG. 4A
FIG. 4B

TAPE ACCLIMATION ACCELERATION FOR ENVIRONMENTAL CALIBRATION

BACKGROUND

The present invention relates to transverse dimensional stability of a magnetic recording tape, which is observed by calculating the difference in adjacent servo pattern position measurements, also known as the Servo Band Difference (SBD), and more specifically, this invention relates to accelerating the measurement of environmental acclimation-based dimensional changes of a magnetic recording tape.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape and decreasing the thickness of the magnetic tape medium. However, the development of small footprint, higher performance tape drive systems has created various challenges ranging from the design of tape head assemblies for use in such systems to dealing with tape dimensional instability.

Tape drives write and read multiple data tracks simultaneously. It is critical that all data tracks are written in the correct locations for proper operation during subsequent readback. If the dimension of the head changes due to temperature or other causes, or if the transducers on the head are not positioned in the proper, design-specified locations due to fabrication variations, then data tracks will be written/read at incorrect locations. Likewise, if the media is not consistent in its dimensions, then the data tracks will move after writing and not be in the same location when the tape is read. In either case, successful read back of the data will be impaired.

SUMMARY

A method, according to one embodiment, includes cycling a shorter length of a tape, that is less than an entire length of the tape, a plurality of times to acclimate the shorter length of the tape. An acclimation change amount of the shorter length of the tape is determined. The acclimation change amount is based on a baseline servo band difference (SBD) measured before the cycling and a post cycling SBD measured after the cycling. The method further includes adjusting SBD values from a beginning of the tape (BOT) to an end of the tape (EOT) based on the determined acclimation change amount.

A system according to another embodiment includes a processor, and logic integrated with the processor, executable by the processor, or integrated with and executable by the processor. The logic is configured to cause the processor to perform operations of the foregoing method.

A computer program product according to another embodiment includes a computer readable storage medium having program instructions embodied therewith. The program instructions are readable and/or executable by a controller to cause the controller to perform operations of the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A shows a hybrid servo pattern written in a dedicated area of a tape medium, in accordance with one embodiment.

FIG. 4B shows a partial detailed view of a TBS pattern, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for determining an effect of acclimation on a partial length of a magnetic recording tape and adjusting at least some baseline SBD values of the tape based on the acclimation change observed for the partial length of the tape.

In one general embodiment, a method includes measuring a baseline servo band difference (SBD) from a beginning of a tape (BOT) to an end of the tape (EOT), and storing values of the baseline SBD measurements in a memory. A shorter length of the tape that is less than an entire length of the tape is cycled a plurality of times to acclimate the shorter length of the tape. A post cycling SBD of the shorter length of the tape is determined and an acclimation change amount of the shorter length of the tape that is a difference between the baseline SBD of the shorter length and the post cycling SBD of the shorter length is determined. The method further includes adjusting the baseline SBD values based on the determined acclimation change amount.

In another general embodiment, a system includes a processor, and logic integrated with the processor, executable by the processor, or integrated with and executable by the processor. The logic is configured to cause the processor to perform operations of the foregoing method.

In another general embodiment, a computer program product includes a computer readable storage medium having program instructions embodied therewith. The program instructions are readable and/or executable by a controller to cause the controller to perform operations of the foregoing method.

Figure 1:
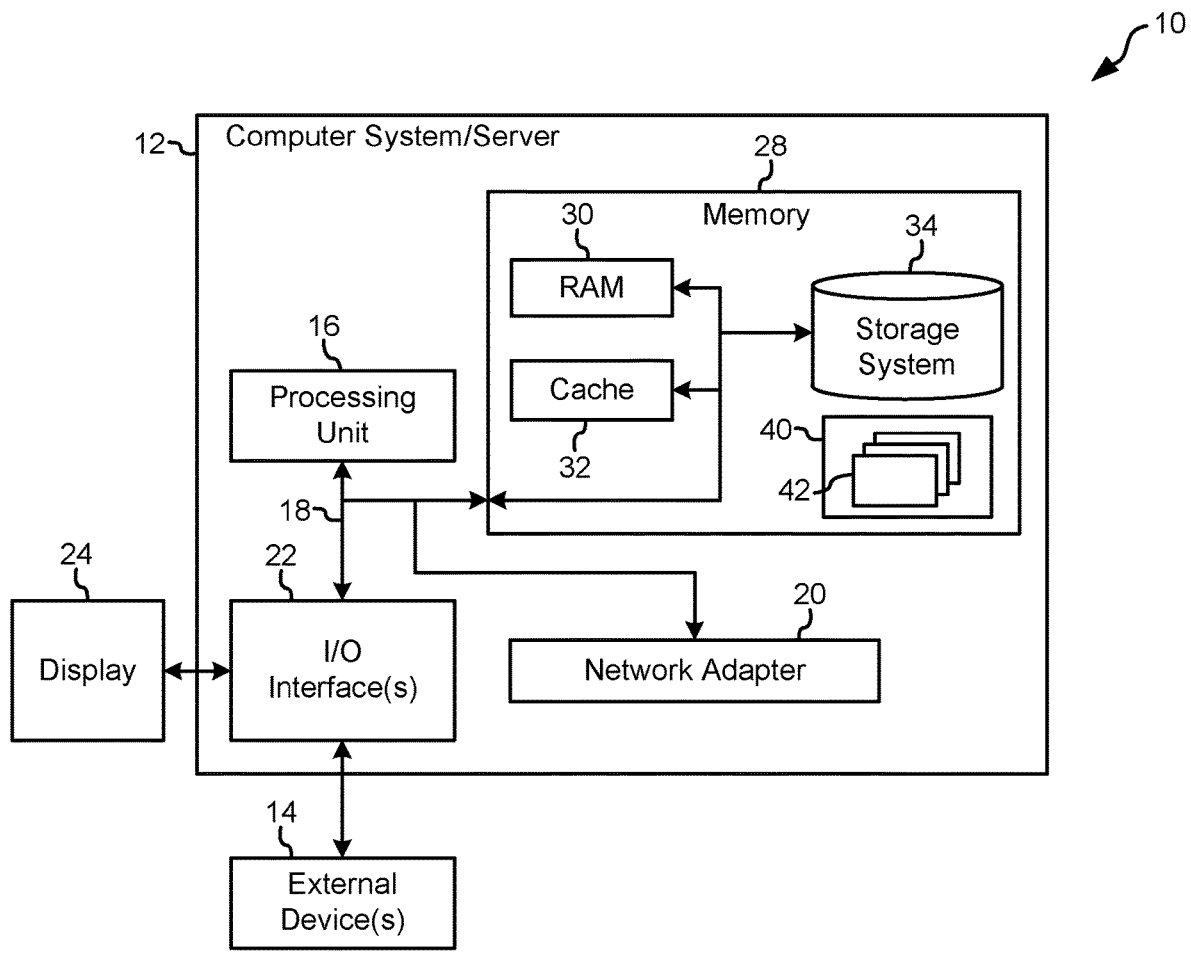
FIG. 1 illustrates a network storage system, in accordance with one embodiment.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disc drive for reading from or writing to a removable, non-volatile optical disc such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
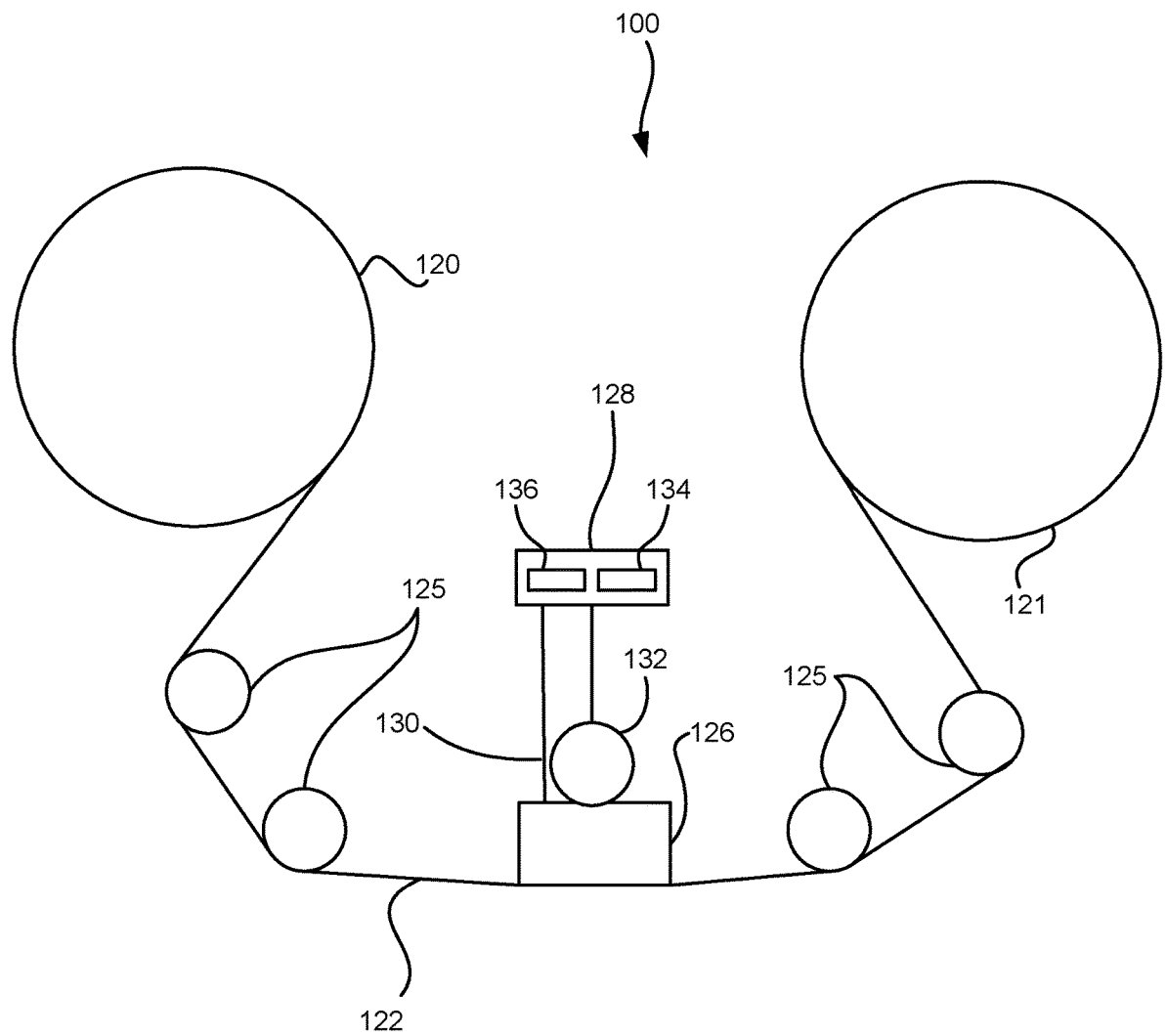
FIG. 2 illustrates a simplified tape drive of a tape-based data storage system, in accordance with one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
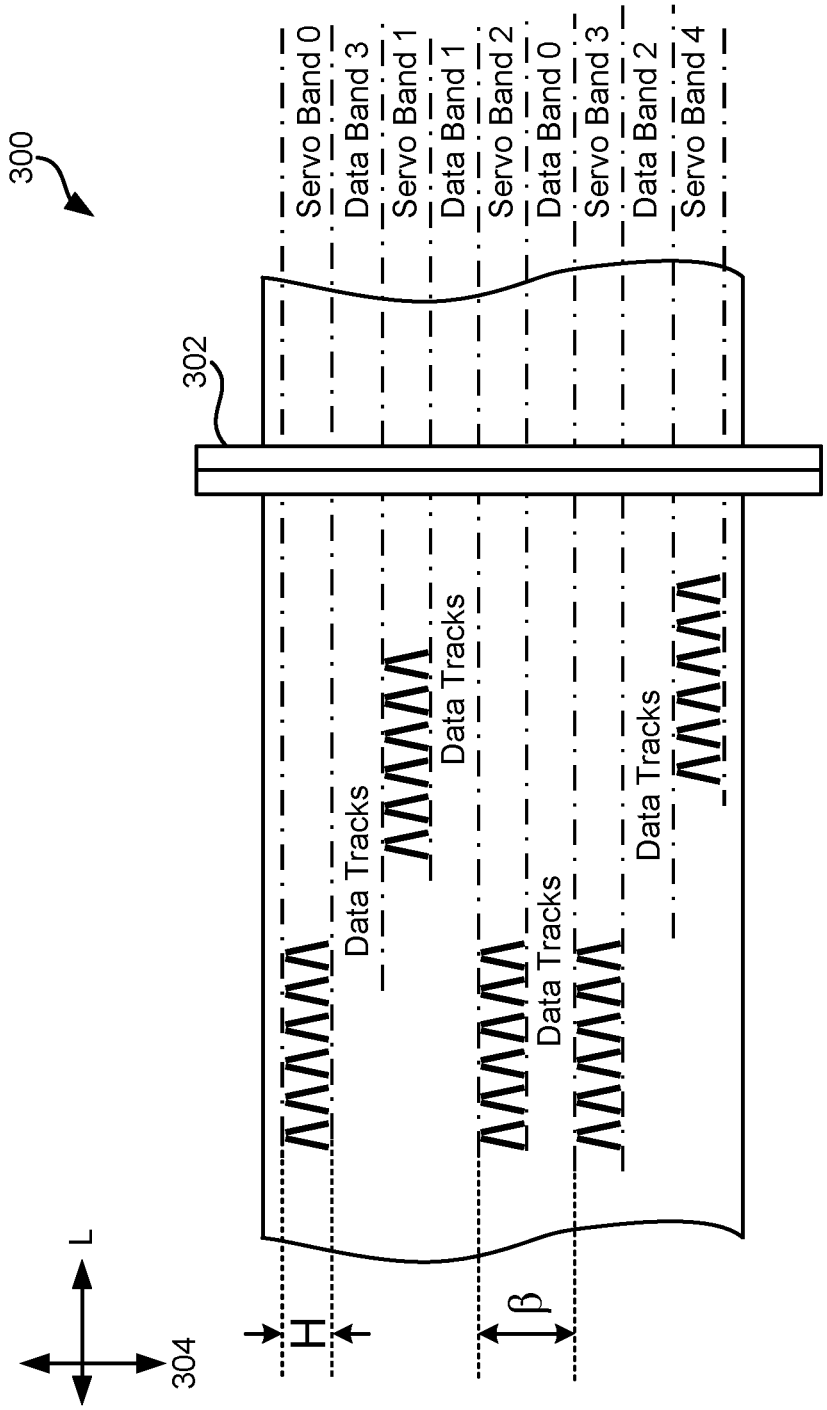
FIG. 3 illustrates a tape layout, in accordance with one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM® Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch β between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TB S pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform, e.g., as seen in FIGS. 5A and 5C. In some approaches, significant features of the original TBS pattern 402 are retained, such as a servo frame structure having four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location;

acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. Accordingly, the depicted TBS frame has four servo bursts 414 and two servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 μm, and the angle α may be about 6°, while the thickness t is about 2.1 μm. Moreover, the spacing S between each of the servo stripes 412 and/or the distance d between servo bursts 414 having the same azimuthal slope may vary depending on the desired embodiment. According to an exemplary approach, which is in no way intended to limit the invention, the spacing S may be about 5 μm, while the distance d is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 4C:
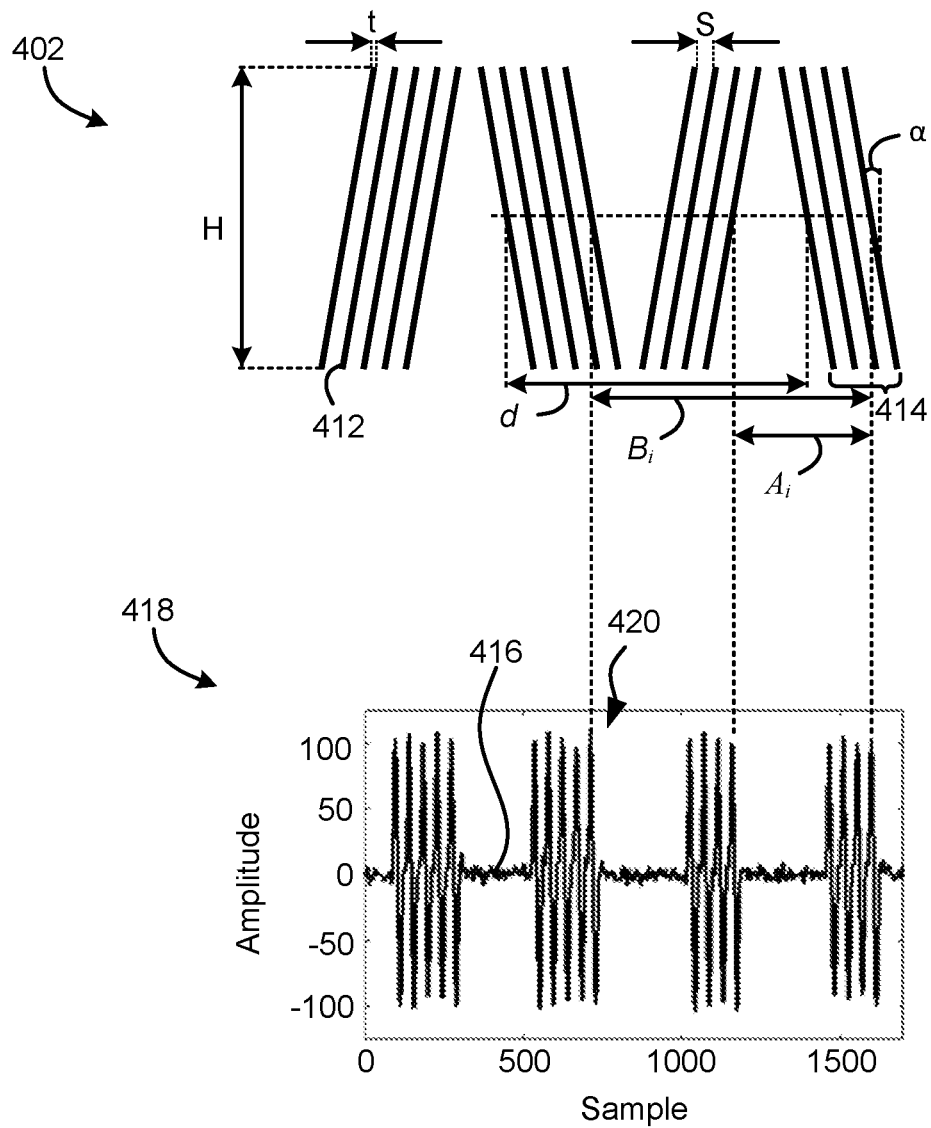
FIG. 4C shows a graph plotting sample vs. amplitude of the TBS pattern of FIG. 4B, in accordance with one embodiment.
Figure 5C:
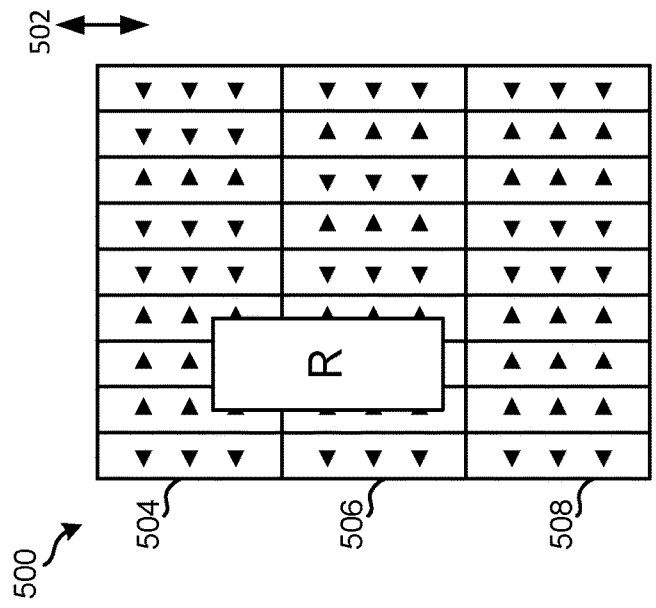
FIG. 5C is a HD pattern, in accordance with one embodiment.

FIG. 4C illustrates a graph 418 plotting sample vs. amplitude of the TBS pattern 402 of FIG. 4B, detected as a servo readback signal 416 during readback. A servo channel may decode the readback signal that is received from a servo reader of a magnetic tape head reading the TBS pattern 402. For example, when a servo stripe 412 of the TBS pattern 402 passes across the servo sensor, a double pulse portion 420 (having a positive peak and a negative peak) of the readback signal 416 is generated, e.g., for purposes of an example see lateral dashed lines indicating how double pulse portions of the readback signal 416 correspond to servo stripe read locations. Accordingly, two or more of such double pulse portions and timing associated therewith may be used in calculating lateral position (y-position) estimates.

In one approach, the servo channel may provide y-position estimates to a track-following control system, e.g., where such y-position estimates are calculated using Equation 1 below.

$$\hat{y} = \frac{d}{2\tan(\alpha)}\left(\frac{1}{2} - \frac{\sum A_i}{\sum B_i}\right) \quad \text{Equation 1}$$

As shown above, the lateral y-position estimate ŷ of Equation 1 may incorporate: the distance d, the azimuthal slope (angle α) of the servo stripes 412, a measured time $B_i$ between pairs of corresponding servo stripes with the same azimuth angle (e.g., parallel stripes //, or \\) from two different sub-frames, and a measured time $A_i$ between pairs of corresponding servo stripes with opposite azimuth angle (e.g., stripes /\) from the same sub-frame.

For example, in the 5-5-4-4 pattern of FIG. 4C, four measurements $A_i$, i=0,1,2,3 and four measurements of $B_i$, i=0,1,2,3 are performed per servo sub-frame of the TBS pattern 402 of FIG. 4B. In some approaches, the distance d is may be referred to as the "sub-frame length."

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled IV) spans wider in the cross-track direction 502 than a single track, such that at least two tones/frequencies are detected under any reading conditions at a given time when the servo reader R is overlapped with the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 μm to about 150 μm, such as about 60 μm, about 75 μm, about 100 μm, etc., depending on the approach. Moreover, the symbol length may be in a range from about 0.5 μm to about 3.0 μm, e.g., such as about 1.0 μm, about 1.5 μm, about 2.0 μm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Figure 5D:
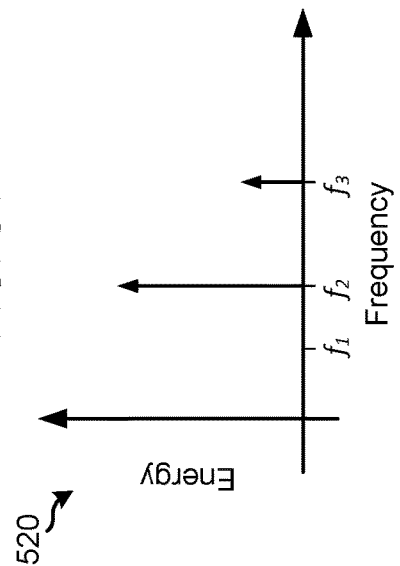
FIG. 5D is a graph plotting readback energy vs. frequency for the reader in FIG. 5C.
Figure 5A:
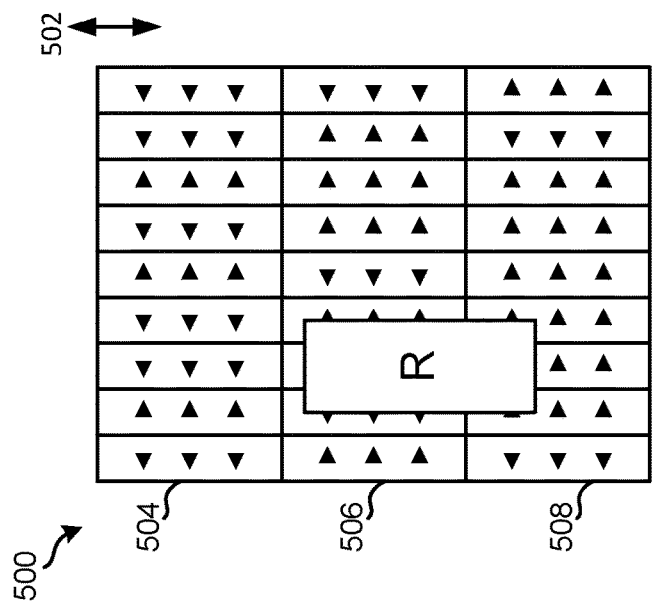
FIG. 5A is a High Density (HD) pattern, in accordance with one embodiment.
Figure 5B:
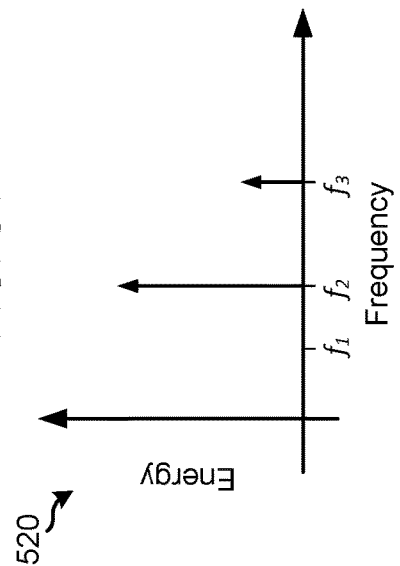
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
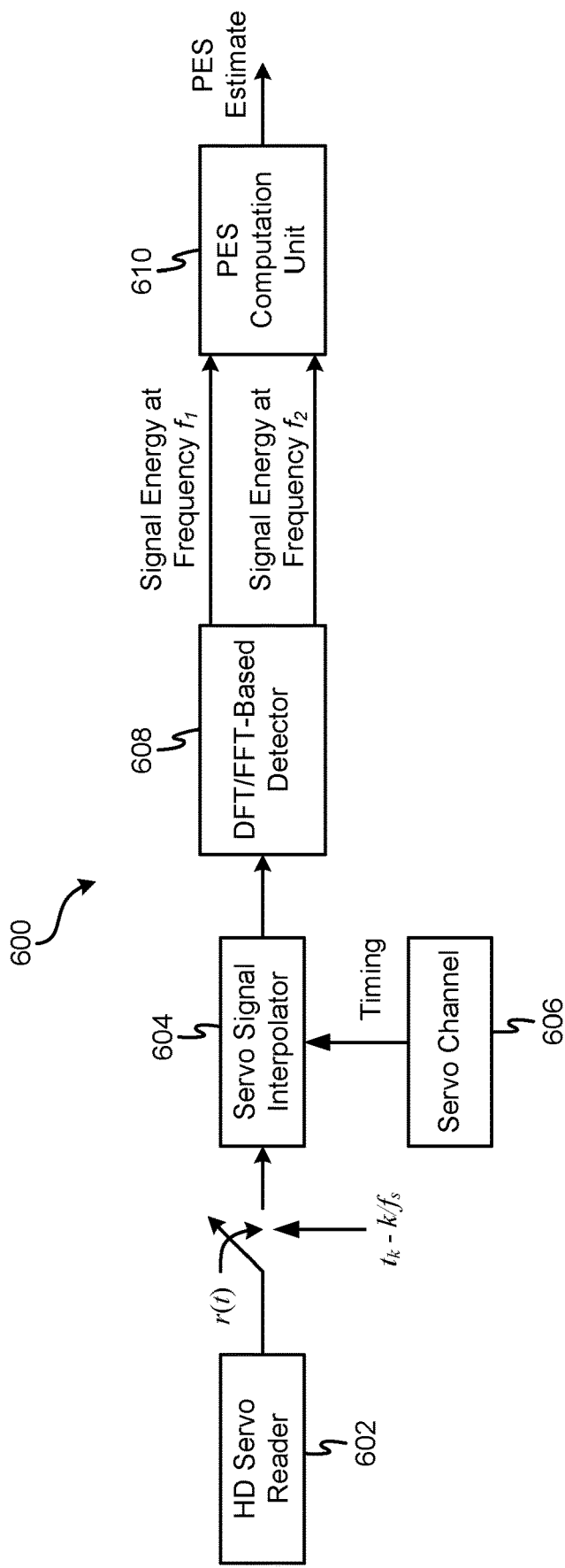
FIG. 6 shows a block diagram of a detector for HD patterns, according to the prior art.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
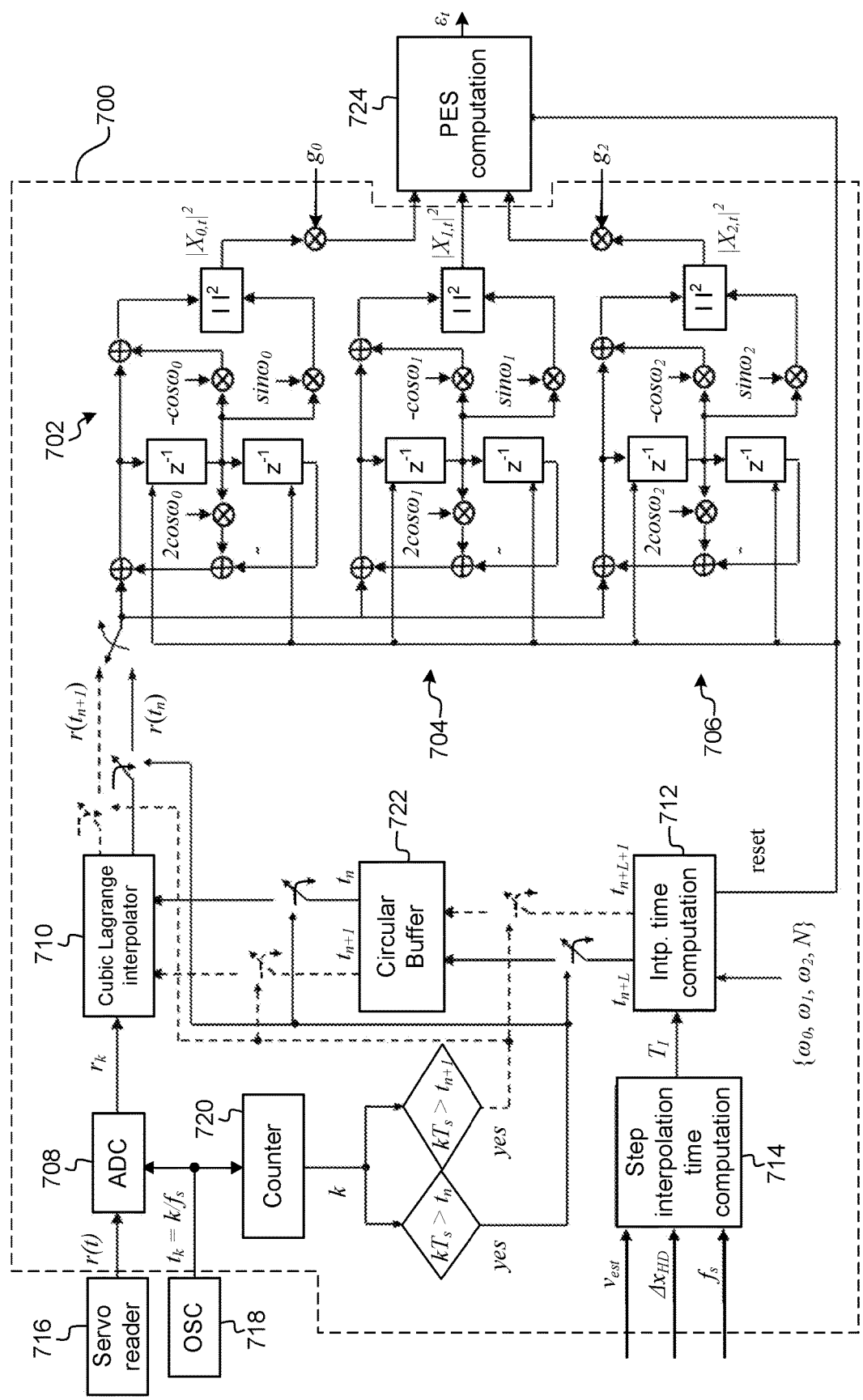
FIG. 7 shows a block diagram of a detector for HD patterns, in accordance with one embodiment.

Now referring to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $w_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the analog-to-digital converter (ADC) 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover the frequency $f_s$ of the clock 718 may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied independently of the tape velocity, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_1$ seconds, where $T_1$ denotes the time interval that it takes for the tape to travel over a distance equal to the step interpolation distance $\Delta x_{HD}$. The estimation of the time interval $T_1$ is performed by a step interpolation time computation unit 714, which computes $T_1=\Delta x_{HD}/V_{est}$, i.e., the ratio between $\Delta x_{HD}$ and the estimate of the instantaneous tape velocity Vest, which may be obtained from the TBS channel in one approach. The TBS channel may operate as a synchronous TBS channel according to one embodiment. The average number of interpolated signal samples generated per ADC clock interval is given by the ratio $T_1/T_s$, where $T_s=1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $c\omega y$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i=2\pi f_i$ from which the coefficients of the digital filters 702, 704, 706 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

Multiplication of the three energy estimates by gain factors $g_i$, for i=0, 1, 2, is provided to compensate for the different attenuations that the readback HD servo signal may experience at different frequencies, where the normalization $g_1=1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate ($\varepsilon_t$) at given time t.

Other components of the HD detector 700 may operate as would be known to one of skill in the art, and are omitted here for the sake of clarity of the described embodiments.

As mentioned elsewhere herein, in magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

Tape drives write and read multiple data tracks simultaneously. It is critical that all data tracks are written in the correct locations for proper operation during subsequent readback. If the dimension of the head changes due to temperature or other causes, or if the transducers on the head are not positioned in the proper, design-specified locations due to fabrication variations, then data tracks will be written/ read at incorrect locations. Likewise, if the media is not consistent in its dimensions, then the data tracks will move after writing and not be in the same location when the tape is read. In either case, successful read back of the data will be impaired.

Fortunately, changes in dimensions of the head, the media, or both can be detected by comparing the difference in the servo reader measurements. This measurement from the servo readers is one method that can be used to determine variations in heads and media, and may be referred herein as SBD. Depending on the approach, SBD information may include the SBD measurement itself and/or information derived from the SBD measurements.

In tape drives, a cartridge is typically calibrated to determine a reference SBD so that tape dimensional stability (TDS) can be managed. For example, this calibration may be performed for each new cartridge. As will be described below, e.g., see method 800, when the cartridge is first loaded, the tape drive may traverse to the end of the magnetic recording tape, making periodic measurements along the way to be stored as reference values. Various approaches for managing dimensional stability issues are presented in various embodiments and approaches described herein.

To measure SBD, servo readers on the same module read respective servo patterns on the media. In the ideal case, both servo readers would measure the same position on their relative servo pattern. However, media and heads are rarely ideal, and therefore any deviation from this ideal case can be determined by comparing the position measurements from the two servo channels. If SBD gets larger, this implies that the tape has contracted in the lateral direction and/or that the head has expanded. Likewise, if SBD gets smaller, this implies that the tape has expanded in the lateral direction and/or that the head has contracted.

Figure 8:
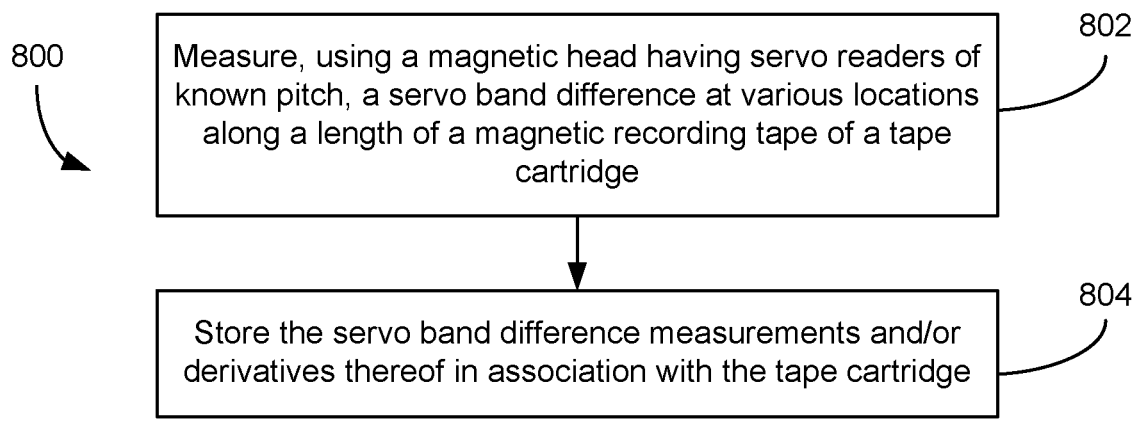
FIG. 8 is a flow chart of a process for characterizing a magnetic recording tape of a tape cartridge.

The SBD measurements may be used to characterize a magnetic recording tape. Referring to FIG. 8, a flowchart of a method 800 for characterizing a magnetic recording tape of a tape cartridge is shown. The method 800 may be performed in accordance with the present invention in any of the environments depicted in FIGS. 1-16, among others, in various approaches. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

This process may be performed when a new tape is being prepared for first use. For example, this process may be added to a conventional cartridge initialization process. This process may also be performed when a data band or data bands on a used tape is ready for overwriting.

Operation 802 of method 800 includes making SBD measurements at various locations along a length of a magnetic recording tape using a magnetic head having servo readers of known pitch. Because the spacing is not generally constant along the length of the tape, the observed SBD measurements are typically different as the tape moves from BOT toward EOT. Without wishing to be bound by any theory, it is believed that this change is due at least in part to the pack stresses that are imputed in tape when stored in the cartridge. SBD measurements may be taken for some, and preferably for each of the data bands on the tape. Preferably, the SBD measurements are taken at various locations along about an entire length of the magnetic recording tape, but, in some approaches, only a portion of the length of the tape is characterized. The tape is ideally maintained at about constant tension while measuring the SBD to minimize tension-induced dimensional changes of the tape. The constant tension is preferably similar to the preferred tension for read and/or write operations on the magnetic tape.

In one approach, while holding the tape tension about fixed, the tape drive moves the tape from BOT to EOT while making measurements of SBD. Since the SBD tends to change from BOT to EOT, multiple measurements are preferably made. In general, any granularity of measurement interval can be applied, with higher numbers of SBD measurements providing more information for later use. In some preferred approaches, at least 100 SBD measurements are taken between BOT and EOT for each data band, and more preferably at least 200 SBD measurements may be taken between BOT and EOT for each data band, though less than 100 measurements may be taken in some approaches.

Note that servo reader pitch varies from head to head, and therefore, the raw SBD measurements do not typically reflect the actual servo track spacing. Said another way, wider or narrower servo pitch on the head than the assumed pitch would cause an error in the measurement of the current media spacing value. Accordingly, during this process, the pitch of the servo readers on the head is preferably known, and used to adjust (compensate) the SBD values so that the SBD values more accurately reflect the actual media spacing characteristics. The pitch of the servo readers corresponds directly to the spacing of the servo readers relative to each other, and may be center-to-center pitch, edge-to-edge pitch, etc.

The pitch of the servo readers may be derived or obtained in any suitable known manner. Typically, this value is stored in the memory of each drive during manufacture thereof. In one approach, the pitch is measured for each drive at manufacturing and placed in a non-volatile area of drive memory such as with the vital product data (VPD). This head calibration can be performed in multiple ways, such as measurement with an atomic force microscope (AFM) using stages, the use of a reference tape having servo tracks of known spacing, or any other method which provides a measurement of transducers relative to other transducers. In another approach, the pitch is measured for a drive after the drive has been built, and optionally in use. In a preferred approach, a reference tape may be used.

By using the pitch value stored in the VPD, when a tape is characterized using process 800, the measurements observed can be compensated according to the head spacing value stored in VPD, thus ensuring that the measurements taken, and corresponding values ultimately written to the cartridge memory (CM), are representative of the cartridge, and not unduly influenced by the head making the measurement.

Additionally, by using temperature and/or humidity sensors in the drive (or external sensors with information communicated to the drive), the effects of the local temperature and/or humidity can also be compensated for. For example, if the humidity is high, then tape expands and the cartridge is initialized at this high humidity condition. It is desired that the stored SBD values represent a nominal condition in head spacing, temperature, and humidity.

In operation 804, the SBD measurements and/or derivatives thereof (collectively referred to herein as "SBD information") are stored in association with the tape cartridge. Preferably, the SBD information includes a position along the tape where each SBD measurement was taken, in association with the corresponding SBD measurement. For example, Linear Tape Open (LTO) linear positioning (LPOS) information may be stored in association with each SBD measurement. Accordingly, a representation of the media spacing characteristics at the time of performing method 800 is stored for later use.

Any of a plurality of storage techniques may be used to store SBD information, such as storage of raw points; fitting of the measurements to a function (linear, polynomial, spline, etc.) and then storing the coefficients or describing variables; etc. The SBD information can be stored in any suitable location where it can be referenced at a later time. The SBD information is preferably written to the CM of the cartridge. Other locations for storage of the SBD information include on the tape itself, e.g., in the header information; on a removable storage device of the cartridge, e.g., an SD card; in a database of information about tape cartridges, e.g., in a library database; in cloud-based storage; etc.

The method 800 may be performed as part of a cartridge initialization procedure. For example, in addition to performing conventional special operations during the first load of a brand-new cartridge, the operations of method 800 may be performed during the cartridge initialization process.

The method 800 may also be invoked at times other than the first load. For example, the timing for performing method 800 may correspond to other operations, such as changing the format of the tape, after a garbage collection process renders all data on the tape deleted, etc. Characterizing or recharacterizing the tape at times other than the first load may be useful to reset the SBD information to account for any creep that has occurred in the media since the previous initialization. Other operations, such as those that are completely destructive, such as the format command, may be considered as appropriate times to reissue the cartridge initialization.

Figure 9:
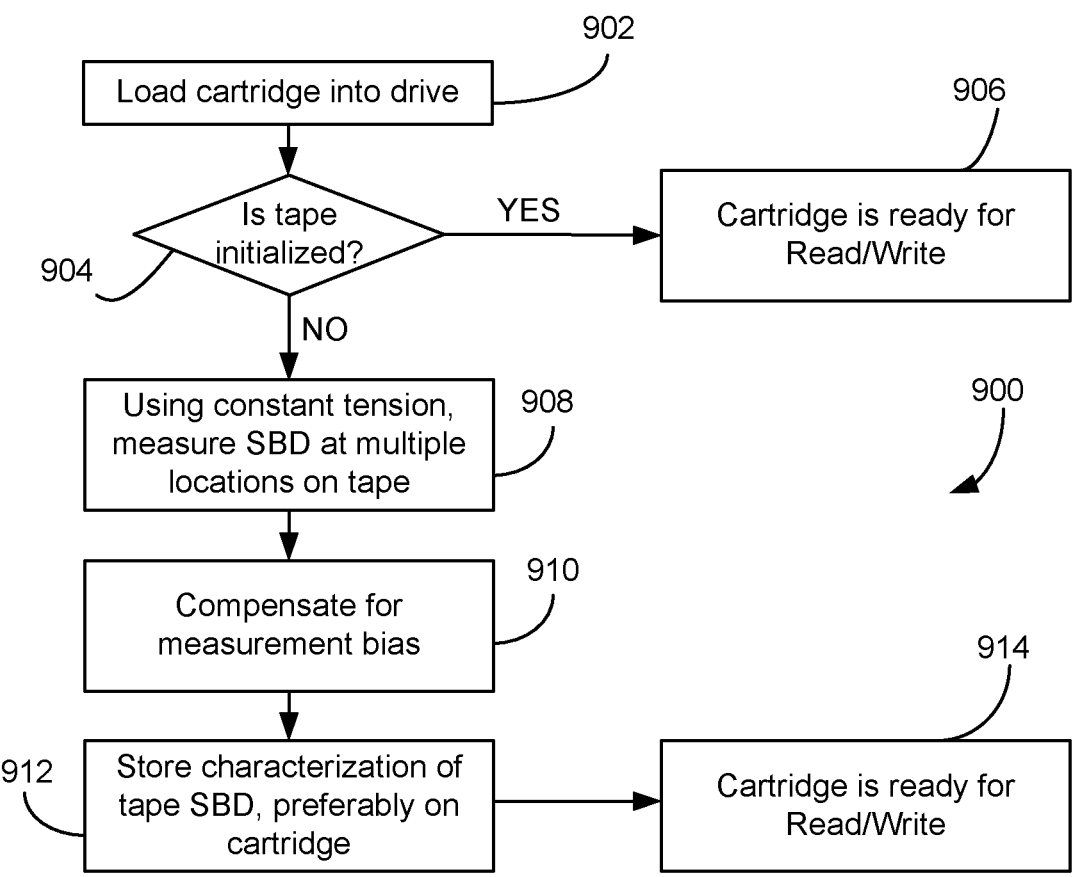
FIG. 9 is a flowchart of a process for characterizing a magnetic recording tape of a tape cartridge in one illustrative approach.

FIG. 9 is a flowchart of a method 900 for characterizing a magnetic recording tape of a tape cartridge in one illustrative approach. The method 900 may be performed in accordance with the present invention in any of the environments depicted in FIGS. 1-16, among others, in various approaches. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

Operation 902 of method 900 includes loading a cartridge into a tape drive. At decision 904, a determination is made as to whether the tape has been initialized, e.g., using the method 800 of FIG. 8, and SBD information is available for the tape. If so, the cartridge is deemed ready for read and/or write operations. See operation 906. If SBD information is not available, the method 900 proceeds with operation 908 where the SBD is measured at multiple locations of the tape using about constant tension. In operation 910, the measurements are compensated for any of a variety of parameters. For example, the measurements may be compensated due to measurement bias from the head dimensions, and namely the servo reader pitch. The compensation may also and/or alternatively have a temperature and/or humidity component. In operation 912, the SBD information is stored, preferably in the CM of the cartridge, but may be in other locations such as on the media itself, in a removable memory coupled to the cartridge such as an SD card, etc. The cartridge is deemed ready for read and/or write operations. See operation 914.

Figure 10:
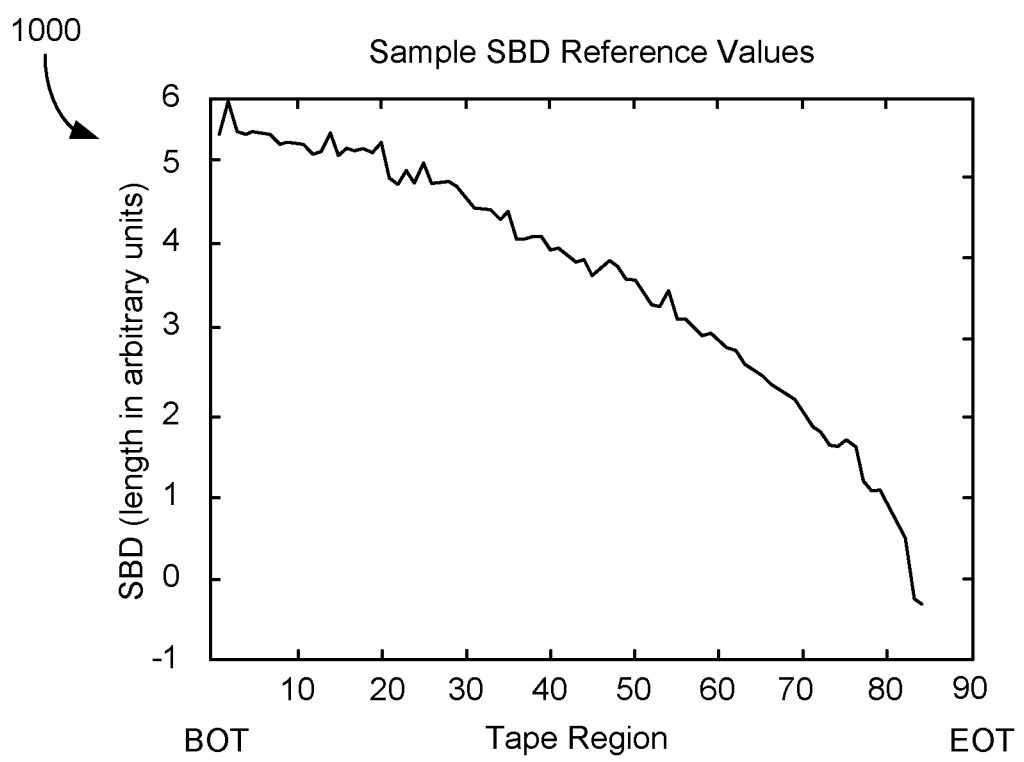
FIG. 10 illustrates exemplary sample SBD reference values from Beginning of Tape (BOT) to End of Tape (EOT) gathered during performance of the process of FIG. 8.

FIG. 10 is a chart 1000 that illustrates exemplary sample SBD reference values from BOT to EOT gathered during performance of the method 800 of FIG. 8. As shown, the SBD measurements are highest at BOT and turn slightly negative by EOT. As noted above, where SBD is larger, this implies that the tape has contracted in the lateral direction in the time since the servo tracks were written. Likewise, where SBD gets smaller, this implies that the tape has expanded in the lateral direction.

Various embodiments and approaches described above detail a tape drive traversing to an end of a magnetic recording tape and making periodic measurements along the way to be stored as reference values. This may be performed once the magnetic recording tape has been loaded for a first time, as well as in response to some command such as a format command. However, it is important to note that a current environment of the drive may be different than the environment that the cartridge was manufactured in. As a result, it is likely that the new environment has not fully diffused into the entire tape pack. For example, it may take months or even years for a tape pack wound on a cartridge reel to be completely acclimated, e.g., a moisture content of the entire tape pack to become about uniform. If SBD values are simply calculated from a tape that is not acclimated, the SBD values will likely change as the tape acclimates, resulting in incorrect baseline SBD values. One potential solution is to acclimate the entire tape before measuring for the SBD values by cycling the tape from the BOT to the EOT to the BOT multiple times to cause acclimation. However, this is a relatively time consuming process. For context, the expected wait time for a tape drive to perform such cycling on conventional magnetic recording tapes may be about six minutes or more per cycle. This is considerably time consuming in the field of data storage where consumers expect negligible wait times.

To compensate for changes in tape width due to acclimation of the tape, allow measurement of baseline SBD values, and to adjust the SBD values to account for the changes in a time efficient manner, various embodiment and approaches described herein may be implemented which include cycling a shorter length of a tape that is less than an entire length of the tape a plurality of times and determining an acclimation change amount of the shorter length of the tape to apply to baseline SBD values of the entire tape. This shorter portion of the tape acclimates to the environment, and by again measuring the SBD values for the acclimatized portion of the tape, a correction factor can be determined and applied to some or all of the baseline SBD values, e.g., for the entire length of the tape. This process enables a relatively quick and fairly accurate determination of what the acclimated pack SBD profile is for the entire tape, as the lengthy wait time otherwise consumed in acclimatizing a tape by continually cycling the tape from the BOT to the EOT to the BOT multiple times is mitigated by cycling only a smaller local area.

Figure 11:
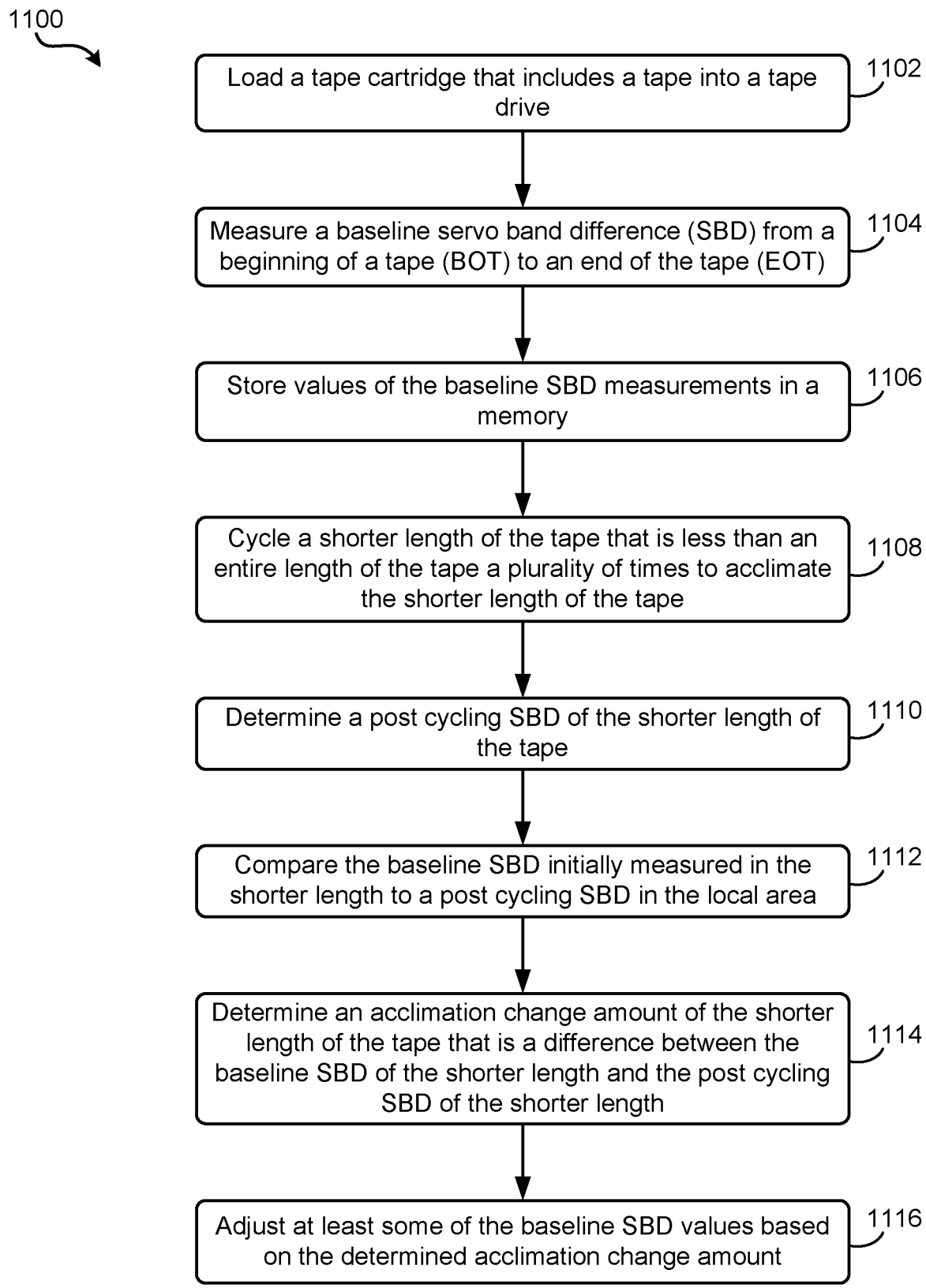
FIG. 11 is a flowchart of a method, in accordance with one embodiment.

Now referring to FIG. 11, a flowchart of a method 1100 is shown according to one embodiment. The method 1100 may be performed in accordance with the present invention in any of the environments depicted in FIGS. 1-16, among others, in various embodiments. Of course, more or fewer operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 1100 may be performed typically by and/or with a tape drive, e.g., a magnetic recording tape drive. Method 1100 may additionally and/or alternatively be performed by a computer. Moreover, for context, method 1100 may be performed to determine an acclimation change of a smaller portion of a magnetic recording tape in a tape cartridge, and using that information to adjust some or all of the SBD values, e.g., for the entire length of the tape, to compensate for acclimation of the tape.

Operation 1102 includes loading a tape cartridge that includes a tape into a tape drive. The tape cartridge may in some approaches be loaded in the tape drive in response to receiving a request, e.g., a request to write data, a request to format the tape of the tape cartridge, a request for an additional tape cartridge in response to a storage consumption of a storage system exceeding a predetermined threshold, etc. In some other approaches, tape cartridge may be loaded in the tape drive without receiving a request. The tape cartridge may in some other approaches already be loaded in the tape drive, and therefore in one or more of such approaches, operation 1102 may be an optional step of method 1100. It should be noted that although the tape cartridge may in some approaches be loaded in the tape drive at a place that the tape cartridge is manufactured, in preferred approaches, the tape cartridge that includes the tape is loaded into the tape drive at a location where the tape will be used for read and/or write operations. This is because SBD measurements taken while the tape cartridge is still located at a manufacturer may reflect different environmental conditions, e.g., changes in temperature, changes in humidity, etc., than at the final in-use location.

Operation 1104 includes measuring a baseline SBD from a BOT to an EOT (along at least a majority of the length of the tape), or equivalently from EOT to BOT. SBD measurement techniques similar to those described elsewhere herein, e.g., see operation 802 of method 800 and related description, may be utilized for measuring the baseline SBD from the BOT to the EOT. The measured baseline SBD from the BOT to the EOT provides an initial dimensional assessment of the tape along the length of the tape. Measurement of the baseline SBD enables creation of SBD values that each correspond to different point along the tape.

In some preferred approaches, one or more operations of method 1100, such as measuring the baseline SBD from the BOT to the EOT, may be performed in response to the tape cartridge of the tape being loaded into a tape drive for a first time, e.g., at a manufacturing site, at an end user's site, etc. In another approach, one or more operations of method 1100, such as measuring the baseline SBD from the BOT to the EOT, may additionally and/or alternatively be performed in response to receiving a format request to format the tape. For context, baseline SBD values calculated soon after the tape cartridge is manufactured or moved to a new location may be different than SBD values calculated after the tape has had time to acclimate to its current environment. For example, two environments may have different relative humidities, have different relative temperatures, etc. These differences in relative environmental conditions may impact dimensional stability over the length of the tape, e.g., such as a width of the tape, and as mentioned above, slowly change the lateral dimensions of the tape as the tape acclimates.

The values of the baseline SBD measurements are stored in a memory in operation 1106. The memory in which the values of the baseline SBD measurements are stored may depend on the approach, and may include any one or more of, e.g., memory of the drive, memory of the tape cartridge, the tape, a database remote from the drive, etc.

As mentioned above, it is likely that the values corresponding to the baseline SBD measurements are not accurate if the tape has not acclimated to its present environment, and the lateral dimensions of the tape will change as the tape acclimates. This is especially likely if the tape cartridge has just been manufactured, has just been removed from its packaging, has recently moved to a new location, etc. and has not been given time to fully acclimate. As also mentioned above, a tape can be urged toward acclimation by being cycled between BOT to EOT one or more times, e.g., sometimes referred to as conditioning of a tape. However, conditioning the entire tape takes a long time, making the practice of conditioning the tape prior to SBD measurement impractical.

In brief, and as described in more detail below with reference to operations 1108-1116, the SBD values calculated above are adjusted to reflect compensate for changes in the tape lateral dimension (width) due to acclimation. Particularly, to make the SBD values calculated above be more reflective of the state of the tape after acclimation, a shorter length of the tape (less than an entire length of the tape) is cycled a plurality of times to acclimate the shorter length. Then, new SBD measurements are taken along the acclimated shorter length and used to determine an effect of acclimation on the shorter length of tape. The entire tape should acclimate in a substantially similar way as the shorter length, and thus the knowledge derived from acclimating the shorter length of tape and taking new SBD measurements can be used to adjust the baseline SBD values of some or all of the tape. The resulting adjusted SBD values are then stored and used for reading and/or writing, e.g., in a manner noted elsewhere herein.

Referring to operation 1108, a shorter length of the tape that is less than an entire length of the tape is cycled a plurality of times to acclimate the shorter length, e.g., the local area, of the tape. For context, the terms "cycled" and "cycling" here refer to spooling the tape from a first end of the shorter length to second end of the shorter length and back to the first end of the shorter length, e.g., along an intended direction of tape travel. This cycling is likely to result in one or more dimensions of the tape changing as the tape acclimates. For example, the tape width with respect to a cross track dimension may increase, the tape width with respect to a cross track dimension may decrease, the tape length may increase, the tape length may decrease, etc. It should be noted that it is expected that additional dimensional changes will occur to some extent during normal operation of the tape, e.g., such as in response to changes in temperature of the tape drive which may be thermodynamically translated to the tape itself, changes in ambient humidity, etc. However, because tape is more responsive to acclimatizing to conditions such as humidity when the tape is being advanced between the cartridge reel and the take-up reel than when stationary, the aforementioned cycling has been found to do a very good job of acclimating the tape.

In general, the smaller the shorter length, the more quickly the cycling can be performed. However, the longer the shorter length, the more accurate the results are, as more of the tape is considered. Accordingly, the length of the shorter length of the tape may be any desired length that is less than the entire length of the tape, depending on the approach. For example, in some approaches the shorter length is less than about 50% of a total length of the tape. According to further examples, the shorter length may be less than about, e.g., 30% of the total length of the tape, 15% of the total length of the tape, 10% of the total length of the tape, etc. According to another example, in one preferred approach, the shorter length is less than about 5% of the total length of the tape. The inventors have found that a shorter length greater than about 0.5% and less than about 5% of the total length of the tape provides a sufficiently accurate result.

In some other approaches, the shorter length of tape may be defined by a portion, e.g., a predetermined number or percentage, of the regions that were previously measured for obtaining the baseline SBD from the BOT to the EOT. For example, in one approach in which one-hundred regions are measured for obtaining the baseline SBD, the predetermined number may be five regions. Accordingly, the shorter length of the tape may include five regions, which may be contiguous on the tape (preferred due to shorter cycling time), contiguous in part, or spaced apart. In another example, one-hundred regions may be measured for obtaining the baseline SBD, and the predetermined number may be three regions. Accordingly, the shorter length of the tape may include three regions. In another approach, where two-hundred regions are measured for obtaining the baseline SBD, the predetermined percentage may be 5%, and therefore the shorter length of the tape may include ten regions. Note that in some approaches the regions are all contiguous to one another, e.g., regions 50-52, regions 1-3, regions 98-100, etc., while in some other approaches, at least some of the regions are not contiguous to one another, e.g., regions 1, 3 and 5; regions 2, 10 and 11; regions 90, 91 and 100; etc.

The number of times that the shorter length of tape is cycled should be sufficient to acclimate the tape, at least with respect to the tape lateral dimension, to within 90% of full acclimation to ambient conditions. However, in some preferred approaches, the shorter length of tape is cycled a plurality of times such that, subsequent to the cycling, any additional cycling of the tape results in minimal environment-based dimensional changes in the current environment of the tape drive. This way, any adjustments made to the baseline SBD values reflect expected operational conditions when using the tape, as opposed to otherwise merely reflecting a state of the tape during the process of acclimatizing the tape. In some approaches, the number of times that the shorter length of tape is cycled is predetermined. According to some more specific approaches, the number of times that the shorter length of tape is cycled may include, e.g., at least 15 cycles, at least 20 cycles, at least 50 cycles, at least 100 cycles, etc. In one preferred approach, the number of times that the shorter length of tape is cycled is between about 15 and about 45 cycles, e.g., about 30 cycles. The number of times that the shorter length of tape is cycled may in some approaches depend on the total length of the tape, e.g., such as where a predetermined percentage of the tape is cycled a predetermined number of times. The number of times that the shorter length of tape is cycled may in some approaches additionally and/or alternatively depend on time constraints, e.g., such as where the shorter length of the tape is cycled a maximum number of times within a predetermined amount of time that the cycling is to be performed on the shorter length of tape. According to another approach, the cycling may be stopped in response to a determination that a difference between a current SBD measurement and a previous SBD measurement falls below a predetermined threshold amount, e.g., by taking SBD measurements during different cycling operations. Stopping cycling in response to the determination that the difference between the current SBD measurement and the previous SBD measurement falls below the predetermined threshold amount may result in the benefit of a faster calibration if the current environmental conditions of the tape drive are similar to an environment that the cartridge was manufactured in. This may be, at least in part, because where the current environmental conditions of the tape drive are relatively more similar to an environment that the cartridge was manufactured in, the tape may be acclimated in relatively fewer cycling iterations than would otherwise be performed in order to acclimate the tape if the current environmental conditions of the tape drive were relatively less similar to the environment that the cartridge was manufactured in. For example, if the shorter length of the tape has become relatively dry since manufacture and is cycled in ambient conditions that are relatively hot and/or dry, the difference between the current SBD measurement and the previous SBD measurement are likely relatively smaller than the difference would be if the shorter length of the tape has remained relatively wet since manufacturing and is cycled in tape drive conditions that are relatively hot and/or dry. Use of the predetermined threshold amount may additionally ensure that the cycling of the tape is not prematurely stopped, e.g., when use of the tape thereafter would, based on continued acclimatization of the tape, likely result in dimensions of the tape changing more than an acceptable amount. Note that the "acceptable amount" of dimensional changing of this approach is preferably determined based on a change in dimensions of the tape that, if measured, would have a difference between the current SBD measurement and the previous SBD measurement that does not fall below, or is equal to, the predetermined threshold amount. According to another approach, the cycling may be stopped in response to a determination that a difference between a current SBD measurement and a previous SBD measurement falls below a predetermined threshold amount for a predetermined number of cycles.

It should be noted that the shorter length of tape may be located on any portion of the tape, e.g., the BOT, the EOT, a middle portion of the tape, a plurality of portions of the tape, etc. However, it should be noted that where the shorter length of tape includes a plurality of different portions of the tape, the portions preferably do not include both the BOT and the EOT, else the processing time improvements that result from acclimating the shorter length of tape will be lost as cycling would include advancing the tape from the BOT to the EOT to the BOT. In one preferred approach, the shorter length of tape is located at a portion of tape that is quickly accessible for cycling upon the tape cartridge being loaded in the tape drive, e.g., such as the BOT. In other words, because the tape drive using drive motors to advance the tape to a location on the tape that is to be conditioned would otherwise ultimately increase an amount of time that is consumed in acclimatizing the shorter length of tape, in some preferred approaches, the shorter length of tape begins with a portion of the tape that is located nearest a tape head of the tape drive upon the tape cartridge being loaded in the tape drive.

A post cycling SBD of the shorter length of the tape is determined, e.g., see operation 1110. SBD measurement techniques similar to those described elsewhere herein, e.g., see operation 802 of method 800, may be utilized for performing SBD measurements, although it should be mentioned that the post cycling SBD of the shorter length of the tape is measured as opposed to measuring the SBD from the BOT to the EOT as described elsewhere herein. After the new SBD measurements are complete, the baseline SBDs initially measured in the shorter length of tape are compared to the post cycling SBDs in the shorter length of tape, e.g., see operation 1112. In some approaches this comparison includes comparing baseline SBD values measured in the shorter length of tape with post cycling SBD values in the shorter length of tape, where each associated pair of the values that are compared are measured in about the same relative location within the shorter length of tape.

Based on the comparison of the baseline SBD initially measured in the shorter length of tape and the post cycling SBD in the shorter length of tape, an acclimation change amount of the shorter length of the tape is determined, e.g., see operation 1114. In some preferred approaches, determining the acclimation change amount of the shorter length of the tape includes comparing the baseline SBD values for the shorter length to post cycling SBD values for the shorter length. Moreover, an average of the differences of the values may be determined, e.g., to reflect an overall delta characterization of the baseline SBD values of the shorter length measured pre-cycling of the tape and post cycling SBD values of the shorter length. For purposes of a contextual example, it may be assumed that 100 predetermined regions of the tape are measured to obtain baseline SBD values, and that the shorter length of the tape corresponds to regions 1, 2 and 3 of the tape where baseline SBD values 1, 2 and 3 are measured before the tape is cycled. After cycling is performed on the shorter length of tape, e.g., such as according to operation 1108 of method 1100, post cycling SBD values 1, 2, and 3 may be measured at about the same locations as the locations at which the baseline SBD values 1, 2 and 3 were previously measured before the tape was cycled. The post cycling SBD values 1, 2, and 3 may be compared to baseline SBD values 1, 2 and 3, and the differences of the post cycling SBD values 1, 2, and 3 and the baseline SBD values 1, 2 and 3 may be determined. In some approaches the differences may be averaged to obtain a single acclimation change amount. Moreover, outlier differences and/or values may be omitted from the averaging, e.g., highest and/or lowest difference, SBD value(s) that are significantly different than a mean SBD value, etc.

The acclimation change amount provides a calculated estimate of what would have occurred if the entire tape were cycled and acclimated rather than the shorter length of the tape, without incurring the large time penalty that cycling and acclimatizing the entire length of the tape would otherwise incur. Accordingly, some or all of the baseline SBD values may be adjusted based on the determined acclimation change amount, e.g., see operation 1116. The determined acclimation change amount may serve as a total tape cartridge acclimation amount by adding or subtracting the acclimation change amount of the shorter length of tape of the tape cartridge to/from the baseline SBD. For context, in continuation of the example above, assuming that the baseline SBD values 1, 2 and 3 are 100, 101 and 102 (respectively), and assuming that the post cycling SBD values at about the same locations are 95, 94 and 97 (respectively), then the differences of the post cycling SBD values 1, 2, and 3 and the baseline SBD values 1, 2 and 3 may be determined to be 5, 7 and 5 (respectively). The average of these values 5, 7 and 5 may be determined to be about 5.67, e.g., $(5+7+5)/3 \approx 5.67$. Accordingly, the acclimation change amount may be determined to be 5.67, which may then be subtracted from the baseline SBD values to thereby estimate a total tape cartridge acclimation.

In some approaches, the post cycling SBD values of the shorter length of the tape may optionally be used as the SBD values for the shorter length of the tape rather than adjusting the baseline SBD values of the shorter length. This is because the post cycling SBD values are directly measured from the shorter length of tape, and therefore may themselves reflect the acclimated state of the tape.

In some approaches, the adjusted baseline SBD values may be stored in a memory, e.g., a memory of the drive and/or a memory of the cartridge. In one or more of such approaches, the adjusted baseline SBD values may thereafter be accessed to compensate for SBD across the tape when performing a read operation and/or a write operation. In some other approaches, adjustment of the baseline SBD values may be performed during performance of the read and/or write operations. For example, during a read operation performed on the tape, a controller of a tape drive may access the determined acclimation change amount and add or subtract the determined acclimation change amount from the baseline SBD values to compensate for SBD while reading across the tape. Results of adding or subtracting the acclimation change amount from the baseline SBD values may then be incorporated into track following operations performed while performing a read operation.

Although the acclimation change amount is preferably determined for a tape only a single time, in some approaches, method 1100 may be performed with respect to a different portion, e.g., a different shorter length, of the tape that is less than the entire length of the tape. In one approach this recalculation may be performed in response to a determination that accuracies of data read and/or write operations performed based on an initially determined acclimation change amount are less than a predetermined threshold, e.g., more than a predetermined number of adjacent tracks are read during a read operation. In other words, in some approaches, the post cycling SBD of the initial shorter length of the tape may inaccurately reflect the SBD of the remainder of the tape, and therefore the determined acclimation change amount that at least some of the baseline SBD values were adjusted by may inherit such inaccuracies. In another approach, this recalculation may additionally and/or alternatively be performed in response to a determination that a predetermined amount of time has passed since the current acclimation change amount was determined. In another approach this recalculation may additionally and/or alternatively be performed in response to a determination that a predetermined amount of viscoelastic creep has occurred on the tape. In yet another approach, this recalculation may additionally and/or alternatively be performed in response to a determination that environmental conditions that the tape cartridge has been located in for at least a predetermined amount of time have changed a predetermined amount, e.g., humidity measured by a humidity sensor of the tape drive has increased the predetermined amount, humidity measured by a humidity sensor of the tape drive has decreased the predetermined amount, temperature measured by a temperature sensor of the tape drive has increased the predetermined amount, temperature measured by a temperature sensor of the tape drive has decreased the predetermined amount, etc. In such approaches, various operations of method 1100 may be performed with respect to the different portion of the tape in the attempt to determine an acclimation change amount for adjusting at least some of the baseline SBD values for achieving relatively more accurate read and/or write operations. In some other approaches, the recalculation of the acclimation change amount may be performed on the same shorter length of the tape. However, it should be noted that the recalculation of the acclimation change amount may compromise the ability to accurately read back data that is recorded on the tape. Accordingly, in some of such approaches, the recalculation of the acclimation change amount is preferably only performed where the entire tape is planned to be overwritten.

It should be noted that there are numerous benefits that are experienced by data storage systems in which one or more techniques described herein, e.g., such as method 1100, are implemented. For example, performance of data storage systems that utilize tape drives improves with respect to an amount of time that is consumed in analyzing and compensating for SBD of a tape of a tape cartridge that has not been previously analyzed for SBD. This is because instead of an entire length of the tape being cycled to acclimate the entire length of the tape, only a shorter length of the tape is cycled to determine an amount to adjust adjusting some or all of the baseline SBD values of the entire length of the tape. As noted elsewhere herein, cycling an entire length of the tape to acclimate the entire length of the tape may consume on average six minutes or more per cycle. For purposes of an example, where the shorter length of the tape is less than about 5% of a total length of the tape, 95% of the full tape cycling time is avoided using the techniques described in method 1100, e.g., about five minutes and forty-two seconds or more per cycle. Accordingly, the inventive discoveries disclosed herein with regards to cycling a shorter length of the tape to determine how to compensate for SBD changes due to tape acclimation across an entire length of the tape proceed contrary to conventional wisdom. Moreover, despite only the shorter length of the tape being cycled, SBD along the entire length of tape is ultimately corrected because the conclusions with respect to SBD characterizations within the shorter length of the tape are applied to the remaining length of the tape. This application of the SBD characterizations of the shorter length of the tape to the remaining length of the tape is made possible with the expectation that the remaining length of the tape will thereafter eventually acclimate in a similar manner as the shorter length of tape did during the cycling performed in operation 1108.

It should be noted that the determined acclimation change amount of the shorter length of the tape and/or other information determined in method 1100, e.g., such as the baseline SBD values, the post cycling SBD of the shorter length of the tape, etc., may be referred to hereafter as "SBD information." The SBD information stored in association with the tape and its cartridge can then be used for other things, such as reading and writing.

During writing, the stored SBD information may be retrieved, e.g., from the CM, and loaded into the drive memory for use as reference values for the desired SBD for the current writing operation. Because most tape formats utilize shingling, the current tracks partially overwrite previously written tracks. The amount of shingling must be precisely controlled, or else too much of the previous track will be overwritten, and the data written to those previous tracks will become unreadable and the data irretrievably lost. As tape and head dimensional changes affect the location of written tracks, it is critical that the current writing operation does not excessively trim, or narrow, the previously written data.

Figure 12:
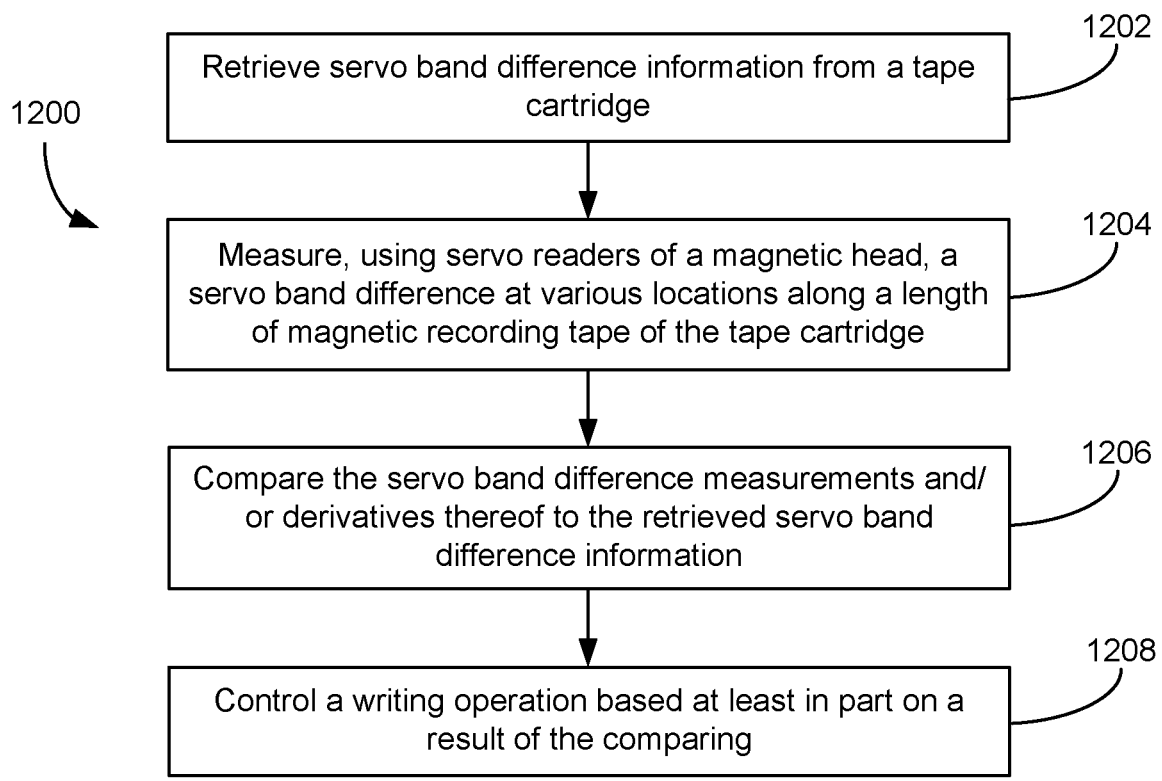
FIG. 12 is a flowchart of a process for controlling writing to a magnetic recording tape of a tape cartridge.

FIG. 12 is a flowchart of a method 1200 for controlling writing to a magnetic recording tape of a tape cartridge. The method 1200 may be performed in accordance with the present invention in any of the environments depicted in FIGS. 1-16, among others, in various approaches. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

The method 1200 may be performed in response to receiving a request to write to a tape of a tape cartridge. Conventional operations are typically performed in addition to the steps below, including loading the tape in the tape drive, mounting the tape, spooling the tape to the proper location for writing, processing index information about the data on the tape, etc.

Operation 1202 includes retrieving servo band difference information about the tape cartridge. Again, the servo band difference information may be retrieved from any source, such as CM of the cartridge, from the tape itself, from a remote database, etc.

Operation 1204 includes measuring, using servo readers of the magnetic head of the tape drive, a servo band difference at various locations along a length of a magnetic recording tape of the tape cartridge. For example, the servo band difference measurements may be taken as the tape is indexed to the writing position. In another approach, measurements may be taken at points along the entire tape or selected portion thereof, prior to writing. Preferably, at least some of the measuring is performed during the writing operation.

Operation 1206 includes comparing the servo band difference measurements and/or derivatives thereof to the retrieved SBD information (such as values in and/or derived from the SBD information). For example, a current measurement may be compared to the SBD value recorded in the CM.

Operation 1208 includes controlling a writing operation based at least in part on a result of the comparing. Any parameter associated with the writing operation may be controlled in operation 1208, such as suspending and/or canceling writing in response to a result of the comparing if operation 1206 being indicative of potential off-track writing; adjusting an operating condition of the tape drive for reducing occurrence of off-track writing such as by changing a width of the tape by adjusting tape tension and/or heating or cooling the tape, adjusting pitches between transducers of the magnetic head e.g., by inducing thermal expansion of the head using an integrated heating device, inducing expansion or contraction of the head using a piezo device, etc.; tilting the axis of the array of transducers away from perpendicular to the direction of tape travel; etc.

Where the comparison of operation 1208 is performed prior to writing, the writing operation may be suspended, e.g., not started, in response to a result of the comparing being indicative of potential off-track writing, and writing conditions may be adjusted in an attempt to improve the results of the comparison. If the result of the comparing is in a predefined range indicating that off-track writing is sure to occur, the entire writing operation may be canceled. If the result of the comparing indicates that only a portion of the tape is unsuitable for writing, writing may be performed in areas of the tape away from that portion.

Where the comparison is performed during writing, the writing operation may be suspended in response to a result of the comparing being indicative of potential (including actual) off-track writing.

In one approach, if the difference between the current SBD information and the stored SBD information is less than an amount which can be tolerated by the format being used, then writing is allowed to continue. If the difference is greater than this amount, then the writing is stopped to prevent overwriting of adjacent tracks. This is a similar situation as when writing is stopped for excessive Position Error Signal (PES) to prevent overwriting of adjacent tracks. If the SBD exceeds a threshold set for the particular format being used, then multiple options are available. One option is to simply stop writing, and if the stop writing distance is long enough, the write operation may cease with a permanent error. In various approaches, this error does cause the writing to stop, but it protects previously written data that would have otherwise been overwritten if not for the stop writing condition.

As noted above, another option to control the writing operation is to utilize a scheme to adjust the SBD, such as varying the tape tension. Note that any other technique to adjust the SBD can also and/or alternatively be utilized. In one approach, the tension is continuously adjusted regardless of SBD relative to the reference CM values. In another approach, the tension is only adjusted if the SBD exceeds a threshold from the reference values. A potential advantage of waiting to adjust tension until after SBD exceeds a threshold is that utilizing tension has some negative side effects, such as creating a tape pack that has a higher stress value. By delaying the use of tension until it is absolutely needed, the negative side effects can be deferred until necessary.

The SBD measurements created in operation 1204 and/or derivatives thereof are preferably stored on the tape cartridge, e.g., in a DSIT, in CM, and/or on tape.

In a preferred approach, for the measurements taken during writing (which may include and/or be measurements taken prior or subsequent to writing but after the tape is loaded and before it is subsequently unloaded, the actual measurements of SBD and/or derivatives thereof at the time of writing are recorded in the DSIT along with details about the data written on tape. This current SBD information is preferably stored regardless of the value written in the CM.

The current SBD information recorded in the DSIT may be different from the SBD information written to the CM during cartridge initialization, as there will typically be some difference in SBD between the initial cartridge characterization and the actual writing of use data. It is important to note that the SBD measured during writing should not be modified by any known head parameters from VPD and/or temperature/humidity effects. While the earlier-stored head spacing values were useful during cartridge calibration to get accurate measurements of the cartridge into the CM, these values should not be recorded during writing, as the measurement of SBD during writing is a statement of the head and media condition at the time of writing. For example, if a "wide" head having a wider than ideal servo spacing were used during cartridge initialization, it would be desirable to remove the bias that the wide head has for the measurement. However, during the actual writing process, this wide head writes tracks in locations that are farther apart and the drive should take the appropriate action for this behavior. The CM holds the reference locations that an ideal writer would observe while writing, while the DSIT contains information about the actual conditions observed during writing.

Figure 13:
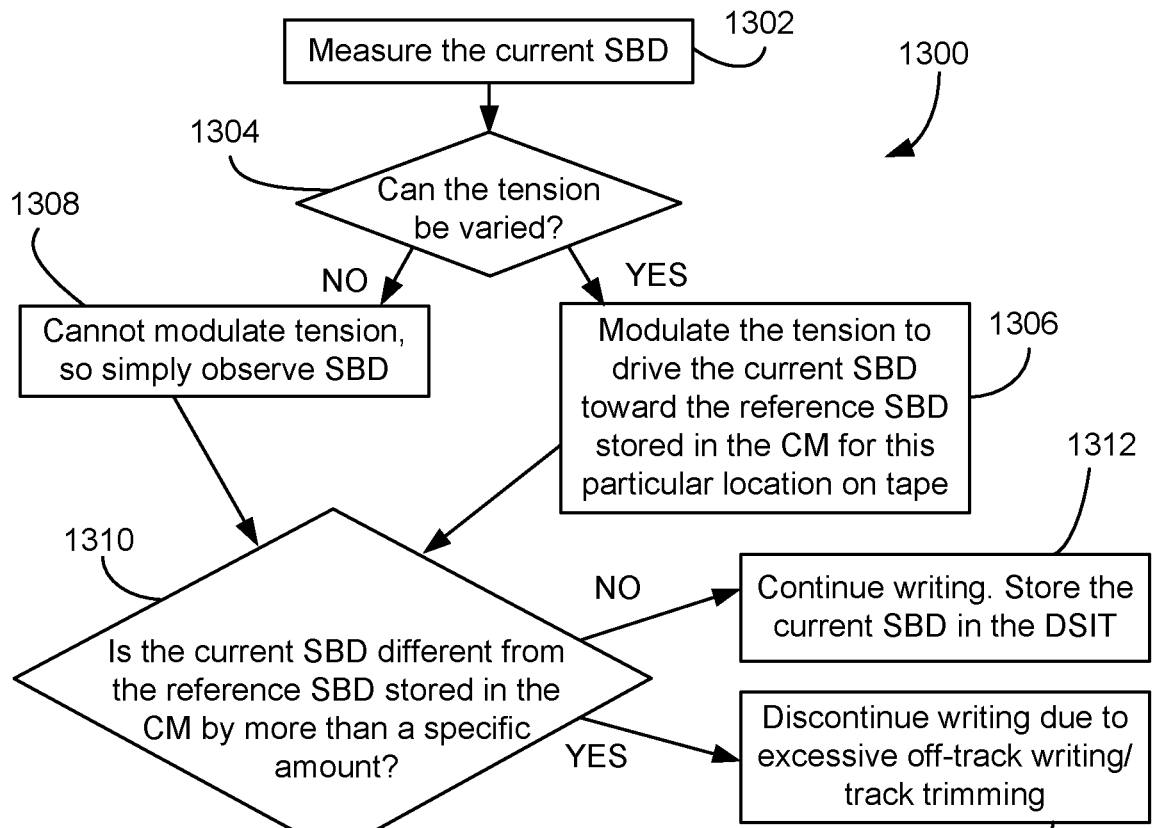
FIG. 13 is a flowchart of a process for one exemplary mode of use during writing.

FIG. 13 is a flowchart of a method 1300 for one exemplary mode of use. The method 1300 may be performed in accordance with the present invention in any of the environments depicted in FIGS. 1-16, among others, in various approaches. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

In operation 1302, before and/or during writing, the current SBD is measured by the writing head. Decision 1304 indicates whether the tension can be varied. If the tension can be varied, the tension is modulated to drive the current SBD toward the reference SBD stored in the CM for this particular location on tape. See operation 1306. If the tension cannot be varied, the SBD is simply observed. See operation 1308. At decision 1310, a determination is made as to whether the current SBD is different from the reference SBD stored in the CM by more than a specific amount, e.g., a predefined amount that is indicative of potential off-track writing. If the current SBD is not different from the reference SBD by at least the specific amount, writing continues in operation 1312. The current SBD may also be stored in the DSIT. If the current SBD is different from the reference SBD by at least the specific amount, writing is discontinued in operation 1314 to prevent off-track writing and/or track trimming.

The present description will now turn to using SBD information during reading operations. During reading, the SBD information stored during writing, such as the values of SBD observed during writing, are read, e.g., from DSIT information. In order to achieve the best reading possible, it is desirable that all of the readers are centered above their respective tracks on tape. This is best achieved when the SBD observed during reading matches the value that was stored, e.g., in the DSIT during writing. When all of the readers are centered above their respective tracks on tape, error rates are lower, and less error correction processing, such as Error Correction Code (ECC) processing is needed. Therefore, the error processing capabilities can dedicate more resources to other operations such as dealing with electronic noise, media defects, and the like. The reading operation may be controlled for such things as suspending writing, modifying the SBD during reading in an attempt to match the SBD from the SBD information stored when the data was written, etc.

Figure 14:
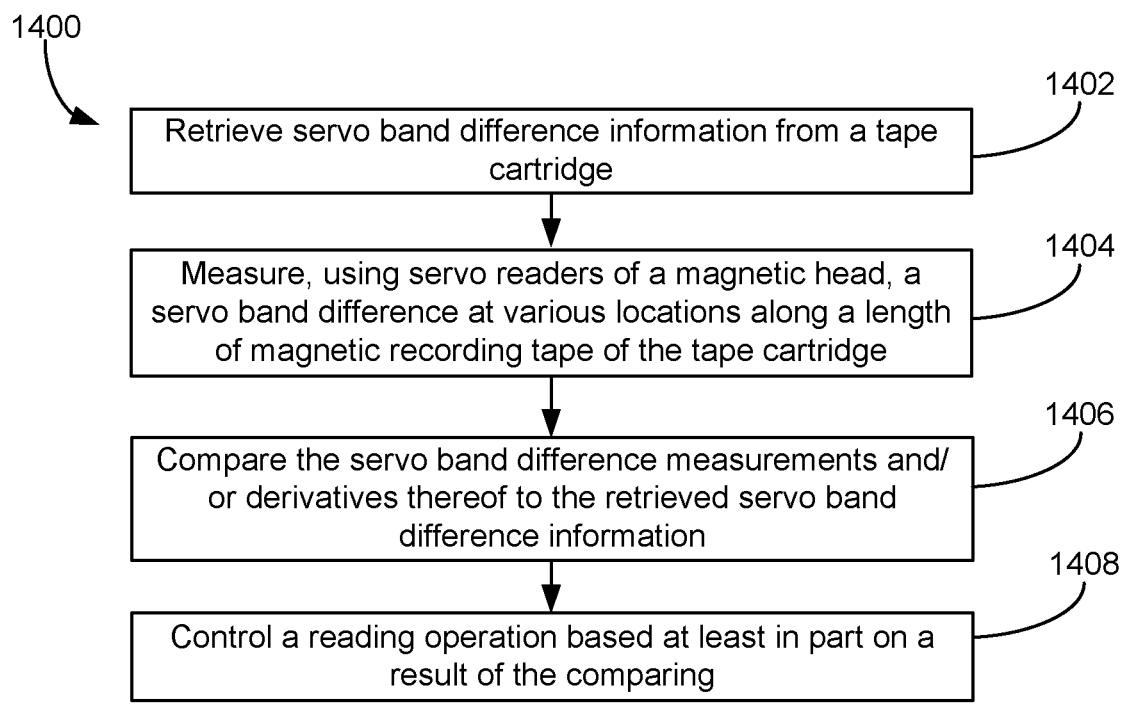
FIG. 14 is a flowchart of a process for controlling writing to a magnetic recording tape of a tape cartridge.

FIG. 14 is a flowchart of a method 1400 for controlling writing to a magnetic recording tape of a tape cartridge. The method 1400 may be performed in accordance with the present invention in any of the environments depicted in FIGS. 1-16, among others, in various approaches. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

The method 1400 may be performed in response to receiving a request to read from a tape of a tape cartridge. Conventional operations are typically performed in addition to the steps below, including loading the tape in the tape drive, mounting the tape, processing index information about the data on the tape, spooling the tape to the proper location for reading, etc.

Operation 1402 includes retrieving servo band difference information about the tape cartridge. Again, the SBD information may be retrieved from any source, such as CM of the cartridge, from the tape itself, from a remote database, etc. Here, the retrieved SBD information is preferably indicative of a condition of the magnetic recording tape contemporaneously with the writing of the data to be read, i.e., as measured at some period between loading for the writing operation and subsequently unloading the tape cartridge. For example, SBD information gathered before (or equivalently, after) writing the data may be retrieved, so that the writing operation can be controlled if needed.

Operation 1404 includes measuring, using servo readers of the magnetic head of the tape drive that will perform the reading operation, a servo band difference at various locations along a length of a magnetic recording tape of the tape cartridge. For example, the servo band difference measurements may be taken as the tape is indexed to the reading position. In another approach, measurements may be taken at points along the entire tape or selected portion thereof, prior to reading. Preferably, at least some of the measuring is performed during the reading operation.

Operation 1406 includes comparing the SBD measurements and/or derivatives thereof to the retrieved SBD information (such as values in and/or derived from the retrieved SBD information). For example, the current measurement may be compared to the SBD information recorded in the DSIT when the data to be read was written to the tape.

Operation 1408 includes controlling a reading operation based at least in part on a result of the comparing. Any parameter associated with the reading operation may be controlled in operation 1408, such as suspending and/or canceling reading in response to a result of the comparing if operation 1406 being indicative of potential off-track reading; performing error recovery in response to a result of the comparing if operation 1406 being indicative of potential off-track reading; adjusting an operating condition of the tape drive for reducing occurrence of off-track reading such as by changing a width of the tape by adjusting tape tension and/or heating or cooling the tape, adjusting pitches between transducers of the magnetic head e.g., by inducing thermal expansion of the head using an integrated heating device, etc.; etc.

As noted above, tension or other technique may be used to modify the SBD during reading to match the SBD written in the DSIT. However, if it is desired not to change the stress of the packed tape, then it may be desirable to not modify the tension, which could result in permanent read errors. If a large difference is observed between the current SBD and the SBD recorded in the DSIT, temporary error recovery may be performed, such as increasing the tension range (or utilization of tension modulation, even if the initial setting was to leave tension fixed). Typically, an error recovery operation is preferable to an error condition. However, other drives that have different reader head spacing values (pitch), or other temperature and/or humidity conditions, may also change the apparent spacing during read which may more closely align the readers with their respective tracks.

Figure 15:
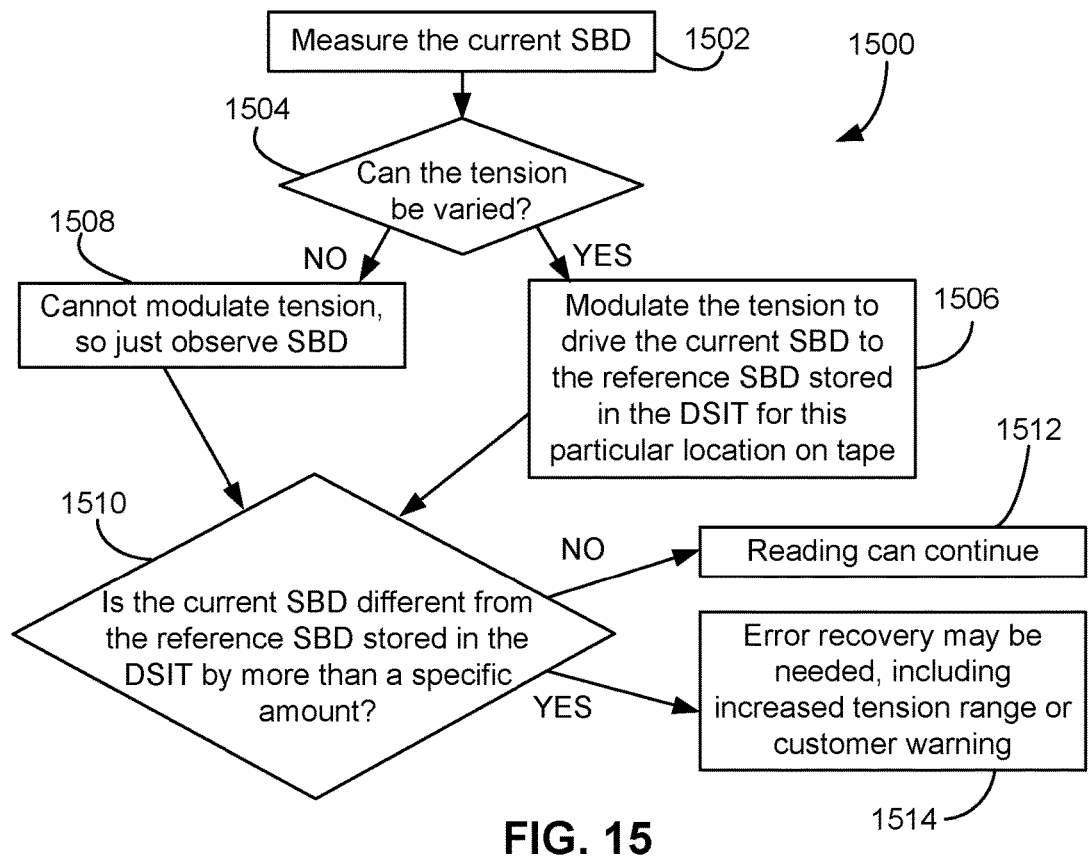
FIG. 15 is a flowchart of a process for one exemplary mode of use during reading.

FIG. 15 is a flowchart of a method 1500 for one exemplary mode of use. The method 1500 may be performed in accordance with the present invention in any of the environments depicted in FIGS. 1-16, among others, in various approaches. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

In operation 1502, before and/or during reading, the current SBD is measured by the reading head. Decision 1504 determines whether the tension can be varied. If the tension can be varied, the tension is modulated to drive the current SBD toward the reference SBD stored in the DSIT for this particular location on tape. See operation 1506. If the tension cannot be varied, the SBD is simply observed. See operation 1508. At decision 1510, a determination is made as to whether the current SBD is different from the reference SBD stored in the DSIT by more than a specific amount, e.g., a predefined amount that is indicative of potential off-track reading. If the current SBD is not different from the reference SBD by at least the specific amount, reading continues in operation 1512. If the current SBD is different from the reference SBD by at least the specific amount, remedial measures are taken in operation 1514, such as performing error recovery, such as increasing a tension range, etc. A customer warning may also, or alternatively, be output.

In addition to generation and use of SBD data as described in detail above, one further advantage is that SBD information, e.g., stored in the CM during cartridge initialization, may be used as reference values to measure the amount of creep that a tape cartridge has experienced. For example, assume that data is stored on a tape of a tape cartridge, and then a user wanted to know five years later what the condition of the tape is in terms of the extent of creep, the tape may be loaded into a drive and the SBD measured from BOT to EOT or some length therebetween, e.g., in a motion similar to the initial cartridge initialization. Even if this verification is performed on a different drive than the drive used for initialization of this particular tape cartridge, because both drives have their respective head spacing values, the current measurements can be compensated. Additionally, temperature and/or humidity compensations may also be applied to more closely approximate the tape spacing condition in the nominal situation. What remains is a comparison of the tape condition at initialization to the present condition without the influence of the initializing head or the verifying head, and/or other environmental variations. It may be desired to quantify the amount of creep, the amount of environmental difference, or a combination of both, that has occurred since tape initialization. By recording initial SBD measurements, along with initial head spans, temperature, and humidity, these differences can be obtained. This ability to quantify creep or other changes is a useful feature for large tape library installations where it is desired to periodically measure tapes to ensure that their creep rates are as expected. Determinations may also be made to detect whether specific tapes have crept more than a desired amount, and these tapes can be marked for copying to alternate tapes before excessive creep renders these tapes unreadable. After copying the data to alternate tapes, these high creep tapes may be reinitialized/reformatted, which resets the reference values in the CM and renders any aging/creep that happened previously as irrelevant.

Figure 16:
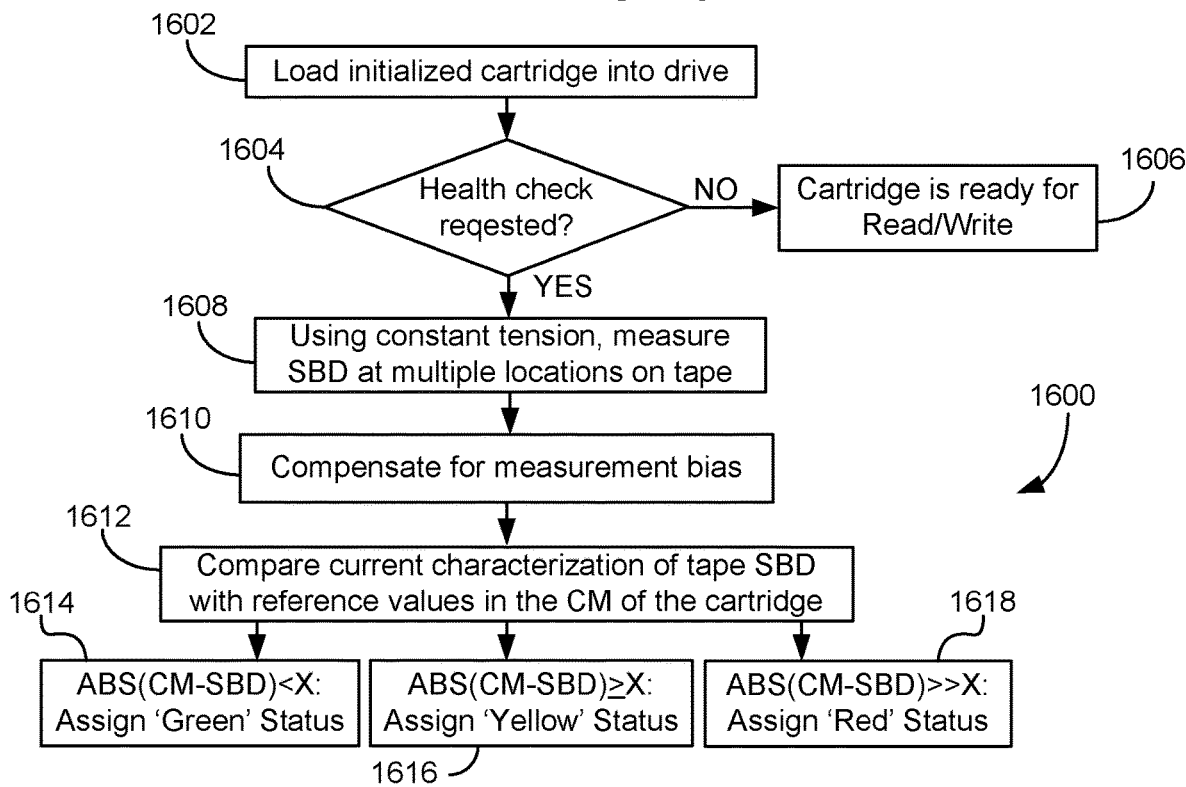
FIG. 16 is a flowchart of a process for characterizing the present state of a tape of a tape cartridge relative to an earlier state thereof.

FIG. 16 is a flowchart of a method 1600 for characterizing the present state of a tape of a tape cartridge relative to an earlier state thereof. This process 1600 enables determination of the effects of aging of the tape, the present effect of environmental conditions on the tape, etc. The method 1600 may be performed in accordance with the present invention in any of the environments depicted in FIGS. 1-16, among others, in various approaches. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a central processing unit (CPU), an application specific integrated circuit (ASIC), a field programmable gate array (FPGA), etc., combinations thereof, or any other suitable computing device known in the art.

The method 1600 may be performed in response to receiving a request to read from and/or write to a tape of a tape cartridge. The request may include a health check. The method 1600 allows the drive, library and/or user to determine whether the read and/or operation will be successful, or may result in excessive overwriting and/or read errors due misregistration between the transducers and data tracks. In another approach, the method 1600 may be performed in response to receiving a request to simply perform a health check. In yet another approach, several of the operations of the method 1600 may be performed automatically without receiving a request for a health check, e.g., in response to determining that the tape has not been written to in more than a predetermined amount of time, the detection of errors when reading, etc.

Conventional operations are typically performed in addition to the steps below, including loading the tape in the tape drive, mounting the tape, processing index information about the data on the tape, etc.

Operation 1602 includes loading an initialized cartridge into a drive. Decision 1604 determines whether a health check has been requested for this cartridge. If not, the cartridge is deemed ready for read and/or write operations. See operation 1606. If a health check has been requested, the SBD is measured at multiple locations along tape using constant tension in operation 1608. Preferably, the tension is about the same as the tension used during initialization. In operation 1610, the measurements are compensated for any of a variety of parameters. For example, the measurements may be compensated for the actual head dimensions, as determined using the drive information. Depending on the type of health check desired, it may be advantageous to also compensate for temperature and/or humidity. In operation 1612, the current characterization of tape SBD is compared with the reference values in the CM of the cartridge that were created during initialization. The effects of aging, such as the extent of creep, may be characterized based on the comparisons, which are preferably done for each SBD measurement, but may be performed for a subset thereof. Any type of indication or value for such characterization may be used. An alert may be output to indicate such things as that the comparison indicates the potential for data loss and the user should consider migrating, or should migrate, the data.

In the example shown, if the absolute value of the difference between the reference value in the CM and the current SBD measurement is in a range, such as below a value X, then the creep may be characterized as minimal (e.g., Green Status). See operation 1614. If the absolute value of the difference between the reference value in the CM and the current SBD measurement is in another range, such as above a value X, then the creep may be characterized as potentially affecting read/write operations (e.g., Yellow Status). See operation 1616. If the absolute value of the difference between the reference value in the CM and the current SBD measurement is in a third range, such as above a value X by a predefined amount, then the creep may be characterized as extremely likely to affect read/write operations (e.g., Red Status). See operation 1618. Actions such as those mentioned above may be taken based on the Status.

This process 1600 enables, among other things, characterization of the aging of a tape so that remedial measures may be taken if desired, thereby minimizing the likelihood of data loss. For example, if the cartridge is assigned a Red Status, the data may be moved to a different cartridge. Once the data is moved and the tape can be erased, the cartridge can be re-initialized and used as normal. The creep no longer is considered an issue because the tape is characterized in its present state.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:
    cycling a shorter length of a tape, that is less than an entire length of the tape, a plurality of times to acclimate the shorter length of the tape;
    determining an acclimation change amount of the shorter length of the tape, wherein the acclimation change amount is based on a baseline servo band difference (SBD) measured before the cycling and a post cycling SBD measured after the cycling; and
    adjusting SBD values from a beginning of the tape (BOT) to an end of the tape (EOT) based on the determined acclimation change amount.

2. The method of claim 1, wherein the method is performed in response to loading a tape cartridge including the tape for a first time.

3. The method of claim 1, wherein the method is performed in response to receiving a format request.

4. The method of claim 1, wherein the shorter length of the tape is less than about 50% of a total length of the tape.

5. The method of claim 1, wherein the shorter length of the tape is less than about 5% of a total length of the tape.

6. The method of claim 1, wherein the number of times that the shorter length of the tape is cycled is predetermined.

7. The method of claim 1, wherein the number of times that the shorter length of the tape is cycled is at least 15.

8. The method of claim 1, wherein the cycling is stopped in response to a determination that a difference between a current SBD measurement and a previous SBD measurement falls below a threshold amount.

9. The method of claim 1, wherein determining the acclimation change amount of the shorter length of the tape includes comparing values of the baseline SBD for the shorter length of the tape to values of the post cycling SBD for the shorter length of the tape, and determine an average of differences of the compared values.

10. A system, comprising:
a processor; and
logic integrated with the processor, executable by the processor, or integrated with and executable by the processor, the logic being configured to cause the processor to perform operations including:
cycling a shorter length of a tape, that is less than an entire length of the tape, a plurality of times to acclimate the shorter length of the tape;
determining an acclimation change amount of the shorter length of the tape, wherein the acclimation change amount is based on a baseline servo band difference (SBD) measured before the cycling and a post cycling SBD measured after the cycling; and
adjusting SBD values from a beginning of the tape (BOT) to an end of the tape (EOT) based on the determined acclimation change amount.

11. The system as recited in claim 10, wherein the operations are performed in response to loading a tape cartridge including the tape for a first time.

12. The system as recited in claim 10, wherein the operations are performed in response to receiving a format request.

13. The system as recited in claim 10, wherein the shorter length of the tape is less than about 50% of a total length of the tape.

14. The system as recited in claim 10, wherein the shorter length of the tape is less than about 5% of a total length of the tape.

15. The system as recited in claim 10, wherein the number of times that the shorter length of the tape is cycled is predetermined.

16. The system as recited in claim 10, wherein the number of times that the shorter length of the tape is cycled is at least 15.

17. The system as recited in claim 10, wherein the cycling is stopped in response to a determination that a difference between a current SBD measurement and a previous SBD measurement falls below a threshold amount.

18. The system as recited in claim 10, wherein determining the acclimation change amount of the shorter length of the tape includes comparing values of the baseline SBD for the shorter length of the tape to values of the post cycling SBD for the shorter length of the tape, and determine an average of differences of the compared values.

19. A computer program product, the computer program product comprising a computer readable storage medium having program instructions embodied therewith, the program instructions readable and/or executable by a controller to cause the controller to perform operations including:
cycling, by the controller, a shorter length of a tape, that is less than an entire length of the tape, a plurality of times to acclimate the shorter length of the tape;
determining, by the controller, an acclimation change amount of the shorter length of the tape, wherein the acclimation change amount is based on a baseline servo band difference (SBD) measured before the cycling and a post cycling SBD measured after the cycling; and
adjusting, by the controller, SBD values from a beginning of the tape (BOT) to an end of the tape (EOT) based on the determined acclimation change amount.

20. The computer program product as recited in claim 19, wherein the operations are performed in response to loading a tape cartridge including the tape for a first time.

21. The computer program product as recited in claim 19, wherein the operations are performed in response to receiving a format request.

22. The computer program product as recited in claim 19, wherein the shorter length of the tape is less than about 50% of a total length of the tape.

23. The computer program product as recited in claim 19, wherein the shorter length of the tape is less than about 5% of a total length of the tape.

24. The computer program product as recited in claim 19, wherein the number of times that the shorter length of the tape is cycled is predetermined.

25. The computer program product as recited in claim 19, wherein the number of times that the shorter length of the tape is cycled is at least 15.

\* \* \* \* \*